US012627348B2

(12) United States Patent
Yang et al.

(10) Patent No.: US 12,627,348 B2
(45) Date of Patent: May 12, 2026

(54) RELAY SELECTION FOR MULTI-RELAY COMMUNICATIONS

(71) Applicant: QUALCOMM Incorporated, San Diego, CA (US)

(72) Inventors: Luanxia Yang, Beijing (CN); Changlong Xu, Beijing (CN); Shaozhen Guo, Beijing (CN); Jing Sun, San Diego, CA (US); Xiaoxia Zhang, San Diego, CA (US); Rajat Prakash, San Diego, CA (US); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/259,316

(22) PCT Filed: Feb. 25, 2021

(86) PCT No.: PCT/CN2021/077823
§ 371 (c)(1),
(2) Date: Jun. 26, 2023

(87) PCT Pub. No.: WO2022/178744
PCT Pub. Date: Sep. 1, 2022

(65) Prior Publication Data
US 2024/0063867 A1 Feb. 22, 2024

(51) Int. Cl.
*H04W 48/20* (2009.01)
*H04B 7/06* (2006.01)
*H04L 5/00* (2006.01)

(52) U.S. Cl.
CPC ......... *H04B 7/0626* (2013.01); *H04L 5/0051* (2013.01); *H04W 48/20* (2013.01)

(58) Field of Classification Search
CPC ..... H04B 7/0626; H04L 5/0051; H04W 48/20
See application file for complete search history.

(56) References Cited

U.S. PATENT DOCUMENTS 8,199,721 B2 * 6/2012 Jung .................. H04B 7/15542
370/332
9,832,741 B1 * 11/2017 Chukka .................. H04B 17/27
(Continued)

FOREIGN PATENT DOCUMENTS

WO        2016182642        11/2016
WO        WO-2019194574 A1 * 10/2019 ............ H04W 88/04

OTHER PUBLICATIONS

International Search Report and Written Opinion—PCT/CN2021/ 077823—ISA/EPO—Nov. 24, 2021.
(Continued)

*Primary Examiner* — Fahmida S Chowdhury
(74) *Attorney, Agent, or Firm* — QUALCOMM Incorporated

(57) ABSTRACT

Wireless communications systems and methods related to routing communications in a multiple-relay environment are provided. A base station (BS) transmits, to one or more wireless communication devices, a reference signal configuration indicating one or more reference signal resources. The base station receives, from a first wireless communication device of the one or more wireless communication devices, a channel state report based on one or more reference signals in the one or more reference signal resources. The channel state report includes channel measurement information for one or more links, each link connecting a wireless communication device of the one or more wireless communication devices to a user equipment (UE). The BS transmits, to the UE via a second wireless communication device of the one (Continued)

or more wireless communication devices based on the channel state report, a data signal.

30 Claims, 13 Drawing Sheets

(56)                    References Cited

U.S. PATENT DOCUMENTS

| | | | |
|---|---|---|---|
| 10,212,651 B2 | 2/2019 | Gulati et al. | |
| 11,683,137 B2 * | 6/2023 | Xu | H04L 5/005 370/329 |
| 11,979,764 B2 * | 5/2024 | Wei | H04B 17/345 |
| 2008/0056174 A1 * | 3/2008 | Jung | H04B 7/15542 370/315 |
| 2009/0296626 A1 * | 12/2009 | Hottinen | H04B 7/155 370/315 |
| 2011/0134848 A1 * | 6/2011 | Tamaki | H04B 7/0626 370/328 |
| 2012/0087299 A1 * | 4/2012 | Bhattad | H04L 5/0053 370/315 |
| 2013/0040558 A1 * | 2/2013 | Kazmi | H04B 7/15507 455/7 |
| 2014/0120967 A1 * | 5/2014 | Pumadi | H04B 17/345 455/501 |
| 2016/0119037 A1 * | 4/2016 | Won | H04B 7/0619 370/328 |
| 2016/0205695 A1 * | 7/2016 | Kishiyama | H04W 52/243 370/315 |
| 2017/0303282 A1 * | 10/2017 | Lee | H04W 76/10 |
| 2017/0325243 A1 * | 11/2017 | Yasukawa | H04L 5/0048 |
| 2018/0206176 A1 | 7/2018 | Panteleev et al. | |
| 2018/0213465 A1 | 7/2018 | Karandikar et al. | |
| 2019/0245640 A1 * | 8/2019 | Yoshimoto | H04J 13/18 |
| 2019/0313269 A1 * | 10/2019 | Keskitalo | H04B 7/15542 |
| 2020/0119821 A1 * | 4/2020 | Qin | H04W 24/08 |
| 2020/0267025 A1 * | 8/2020 | Yu | H04L 5/0051 |
| 2020/0404571 A1 * | 12/2020 | Lin | H04W 8/005 |
| 2021/0143959 A1 * | 5/2021 | Xu | H04W 8/005 |
| 2021/0185754 A1 * | 6/2021 | Da Silva | H04W 76/19 |
| 2021/0321281 A1 * | 10/2021 | Wei | H04B 17/345 |
| 2022/0303866 A1 * | 9/2022 | Zhang | H04W 40/22 |
| 2022/0368496 A1 * | 11/2022 | Shreevastav | H04W 64/00 |
| 2024/0063867 A1 * | 2/2024 | Yang | H04L 5/0051 |

OTHER PUBLICATIONS

Supplementary European Search Report—EP21927187—Search Authority—The Hague—Oct. 28, 2024.

* cited by examiner

1000

| Transmit, to one or more wireless communication devices, a reference signal configuration indicating one or more reference signal resources | 1002 |

| Receive, from a first wireless communication device of the one or more wireless communication devices, a channel state report based on one or more reference signals in the one or more reference signal resources, wherein the channel state report includes channel measurement information for one or more links, each link connecting a wireless communication device of the one or more wireless communication devices to a UE | 1004 |

| Transmit, to the UE via a second wireless communication device of the one or more wireless communication devices based on the channel state report, a data signal | 1006 |

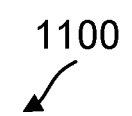

Receive, from a BS, a reference signal configuration indicating one or more reference signal resources ~1102

Transmit, to a UE, a first reference signal in a first reference signal resource signal resource of the one or more reference signal resources ~1104

Receive, from the UE, a first channel state report including channel measurement information for a link between the wireless communication device and the UE based on the first reference signal ~1106

Receive, from the UE, a second reference signal in a second reference signal resource of the one or more reference signal resources ~1108

Transmit, to the BS, a second channel state report based on the second reference signal ~1110

FIG. 11

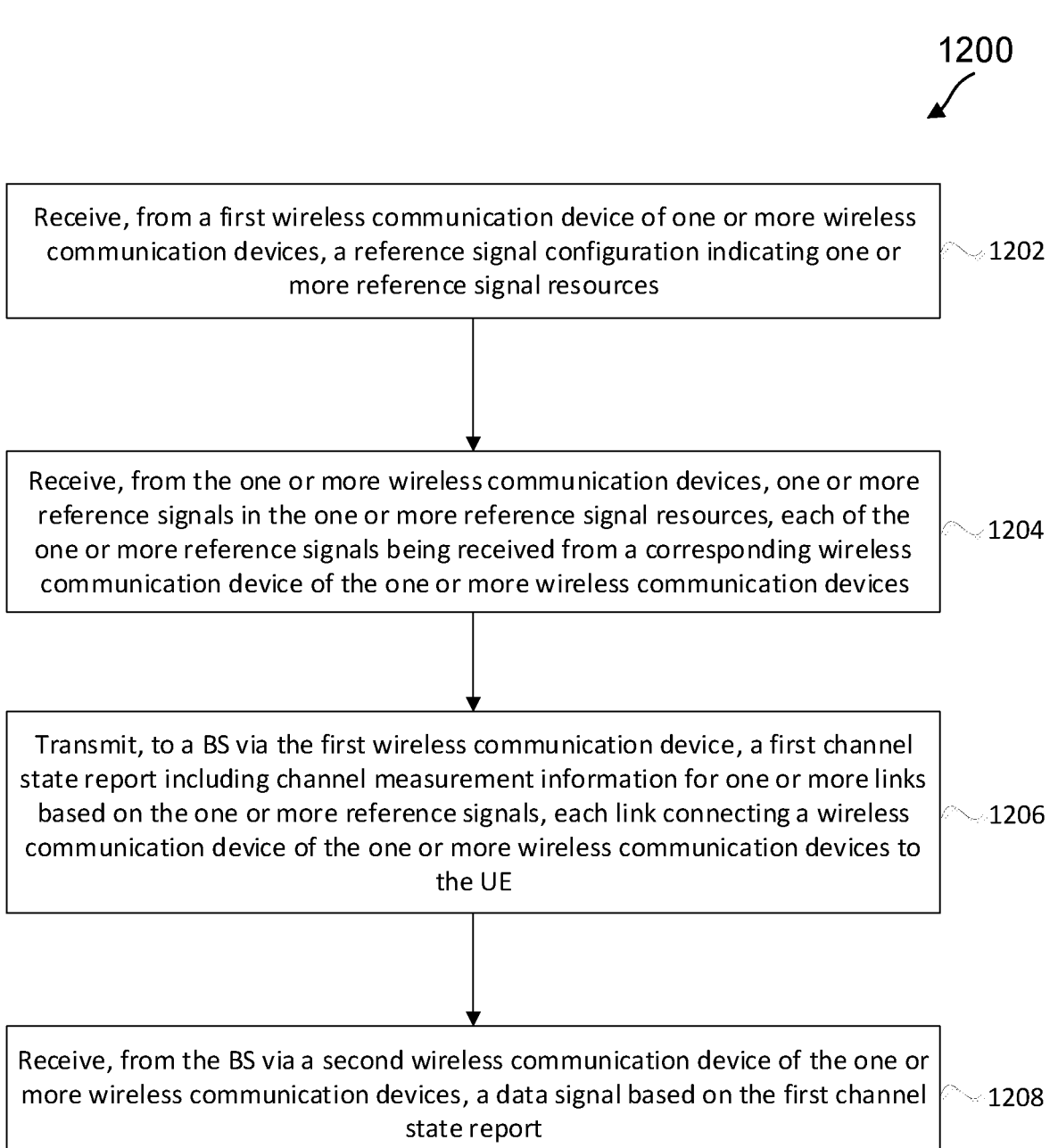

1200

Receive, from a first wireless communication device of one or more wireless communication devices, a reference signal configuration indicating one or more reference signal resources ∼1202

Receive, from the one or more wireless communication devices, one or more reference signals in the one or more reference signal resources, each of the one or more reference signals being received from a corresponding wireless communication device of the one or more wireless communication devices ∼1204

Transmit, to a BS via the first wireless communication device, a first channel state report including channel measurement information for one or more links based on the one or more reference signals, each link connecting a wireless communication device of the one or more wireless communication devices to the UE ∼1206

Receive, from the BS via a second wireless communication device of the one or more wireless communication devices, a data signal based on the first channel state report ∼1208

Receive, from a BS via one or more wireless communication devices, a channel state report including channel measurement information associated with the one or more wireless communication devices ⌇ 1302

Receive, from the BS via a first wireless communication device of the one or more wireless communication devices, an indication of one or more uplink resources associated with the one or more wireless communication devices ⌇ 1304

Transmit, to the BS via a first preferred wireless communication device of the one or more wireless communication devices using an uplink resource of the one or more uplink resources, a first data signal, wherein the first preferred wireless communication device is based on the channel state report ⌇ 1306

FIG. 13

RELAY SELECTION FOR MULTI-RELAY COMMUNICATIONS

CROSS-REFERENCE TO RELATED APPLICATIONS

The present application is a 35 U.S.C. 371 National Phase entry of Patent Cooperation Treaty (PCT) Application No. PCT/CN2021/077823, filed Feb. 25, 2021, which is hereby expressly incorporated herein by reference in its entirety.

TECHNICAL FIELD

This application relates to wireless communication systems, and more particularly to performing communications between devices having access to multiple relays.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to providing high-reliability communication is to use relays to facilitate communication between a base station (BS) and a user equipment (UE). A relay device, which may itself be a UE, may be used in situations where a UE and BS are distant. For example, a UE may be positioned at a distance far from the BS where a direct communication link between the UE and the BS would be unreliable, or where communication through one or more relays would be more reliable than a direct link. Relays positioned between the UE and the BS may forward traffic between the UE and BS. Relays may transmit traffic through other relays, with communication between the UE and the BS involving multiple hops based on the number of relays between the UE and BS.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a base station (BS) includes transmitting, to one or more wireless communication devices, a reference signal configuration indicating one or more reference signal resources. The method further includes receiving, from a first wireless communication device of the one or more wireless communication devices, a channel state report based on one or more reference signals in the one or more reference signal resources, wherein the channel state report includes channel measurement information for one or more links, each link connecting a wireless communication device of the one or more wireless communication devices to a user equipment (UE). The method further includes transmitting, to the UE via a second wireless communication device of the one or more wireless communication devices based on the channel state report, a data signal.

In an additional aspect of the disclosure, a method of wireless communication performed by a wireless communication device includes receiving, from a BS, a reference signal configuration indicating one or more reference signal resources. The method further includes transmitting, to a UE, a first reference signal in a first reference signal resource of the one or more reference signal resources. The method further includes receiving, from the UE, a first channel state report including channel measurement information for a link between the wireless communication device and the UE based on the first reference signal. The method further includes receiving, from the UE, a second reference signal in a second reference signal resource of the one or more reference signal resources. The method further includes transmitting, to the BS, a second channel state report based on the second reference signal.

In an additional aspect of the disclosure, a method of wireless communication performed by a UE includes receiving, from a first wireless communication device of one or more wireless communication devices, a reference signal configuration indicating one or more reference signal resources. The method further includes receiving, from the one or more wireless communication devices, one or more reference signals in the one or more reference signal resources, each of the one or more reference signals being received from a corresponding wireless communication device of the one or more wireless communication devices. The method further includes transmitting, to a BS via the first wireless communication device, a first channel state report including channel measurement information for one or more links based on the one or more reference signals, each link connecting a wireless communication device of the one or more wireless communication devices to the UE. The method further includes receiving, from the BS via a second wireless communication device of the one or more wireless communication devices, a data signal based on the first channel state report.

In an additional aspect of the disclosure, a method of wireless communication performed by a UE includes receiving, from a BS via one or more wireless communication devices, a channel state report including channel measurement information associated with the one or more wireless communication devices. The method further includes receiving, from the BS via a first wireless communication device of the one or more wireless communication devices, an indication of one or more uplink resources associated with the one or more wireless communication devices. The method further includes transmitting, to the BS via a second wireless communication device of the one or more wireless communication devices using an uplink resource of the one or more uplink resources, a first data signal, wherein the second wireless communication device is based on the channel state report.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

FIG. 10 is a flow diagram of a communication method according to some aspects of the present disclosure.

FIG. 11 is a flow diagram of a communication method according to some aspects of the present disclosure.

FIG. 12 is a flow diagram of a communication method according to some aspects of the present disclosure.

FIG. 13 is a flow diagram of a communication method according to some aspects of the present disclosure.

DETAILED DESCRIPTION

Figure 1:
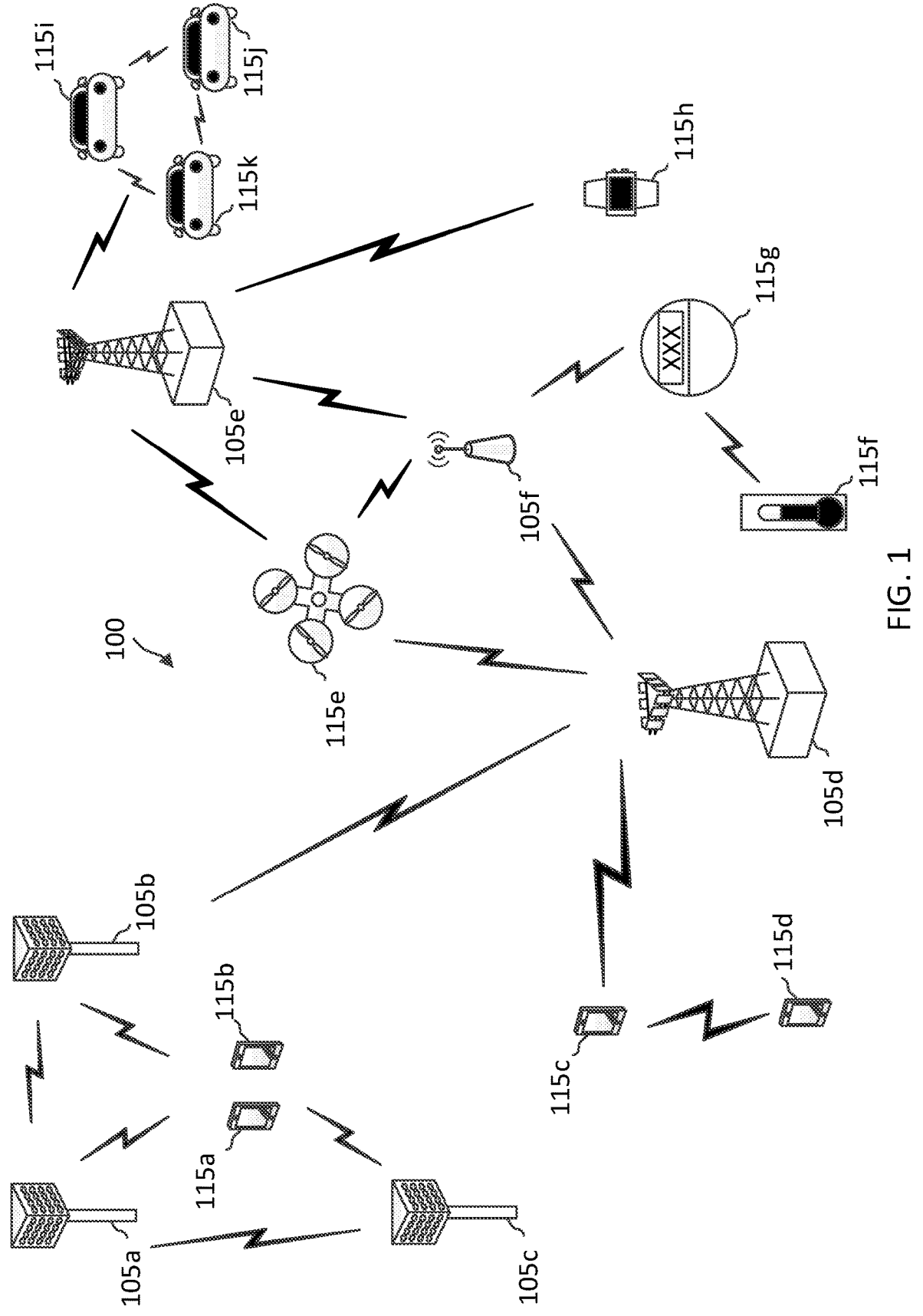
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Communication between wireless communication devices, for example, a user equipment (UE) and a base station (BS) may be aided by one or more additional wireless communication devices, which may act as relays between the UE and the BS. Each relay may itself be a UE. For instance, in some situations, communication between a UE and a BS may be more reliable if routed through one or more relays positioned between the UE and the BS than if routed through a direct link between the UE and the BS. This may be the case, for example, if the UE is outside the coverage area of the BS, or close to the outer boundaries of the coverage area. A signal from the UE to BS may travel through a single relay (e.g., over two hops, one from the UE to the relay, and one from the relay to the BS), or through multiple relays, and vice versa. In some aspects, a UE may be positioned where it may be able to use more than one relay to communicate with a BS. In other words, there may be multiple links available to the UE, each link involving a different relay, or a different series of relays. In addition, multiple UEs may be able to share access to the same relay, which may cause the shared relay to combine data from the multiple UEs before transmitting the data to the BS (directly, or via additional relays). Similarly, the shared relay may need to break up combined data transmissions from the BS, and transmit the data intended for each UE to the intended UE. Combining and uncombining data from and for different UEs may increase resource utilization (e.g., power consumption) at a relay acting as intermediary between the UE and the BS. Aspects of the present disclosure may prevent the increase in resource consumption by enabling a BS and/or a UE to select a single relay (or a fewer number of relays) between them, based on the quality of the link(s) connecting the UE and BS to the relay(s). Selecting a single relay (or a fewer number of relays) may reduce the number of UEs connected to a given relay, preventing the increased resource consumption that may occur as the number of UEs connected to a relay increases.

For instance, a BS may transmit a reference signal configuration indicating one or more reference signal resources (e.g., time-frequency resources) to one or more wireless communication devices. Each wireless communication device may be configured to operate as a relay. For example, the wireless communication devices may include UEs configured to act as relays. For simplicity, the one or more wireless communication devices configured to act as relays may be referred to simply as relays throughout this disclosure. The reference signal configuration may include scheduling information that may be used by the relays to transmit downlink (DL) reference signals to a UE, and by the UE to transmit uplink (UL) reference signals to the relays. The BS may already be connected to the UE (either directly, or through one or more of the relays), for example, through a radio resource control (RRC) connection setup procedure. In some aspects, the relays included in the one or more relays may be based on the location of the UE. For example, the BS may schedule only those relays within a certain distance of the UE to transmit reference signals to the UE. The BS may determine the location of the UE based on, for example, the beam(s) used to communicate with the UE.

Each relay may transmit one or more reference signals in the reference signal resources of the one or more reference signal resources to the UE. For example, each reference signal resource may correspond to a relay of the one or more relays. Each reference signal may be a channel state information-reference signal (CSI-RS) and/or a synchronization signal block (SSB). The UE may perform channel measurement based on the reference signals received from the relays and transmit a channel state report to the BS via a relay (e.g., via the relay the UE and BS are initially communicating through). Additionally, the UE may transmit UL reference signals (e.g., sounding reference signals (SRSs)) to the relays, based on which the relays may perform channel measurements and transmit additional channel state reports to the BS. For example, each relay may receive an SRSs from the UE and prepare and transmit a channel state report (e.g., via physical uplink shared channel (PUSCH)) based on the SRS to the BS.

The BS may receive, from a first relay of the one or more relays (e.g., via the relay through which the BS and UE are initially connected), the channel state report from the UE based on the reference signals transmitted by the relays in the one or more reference signal resources. The channel state report includes channel measurement information for one or more links, each link connecting a relay of the one or more relays to the UE. In some aspects, the channel measurement information may include at least one of a reference signal receive power (RSRP), a signal-to-interference-plus-noise ratio (SINR) (e.g., a level 1 SINR (L1-SINR)), a CSI-RS resource indicator (CRI), or a synchronization signal block (SSB) index (SSB-idx) for each link of the one or more links. The RSRP and SINR may be used to indicate the channel quality, and the CRI and SSB may be used to indicate a beam for communicating with the UE. The channel state report may also include one or more relay identifiers (IDs) identifying the relays to which the channel measurement information (or particular values within the channel measurement information) applies.

In some aspects, a channel state report may include information for fewer links than the number of relays in the one or more relays. For example, the UE may include information (e.g., RSRP, SINR, CRI, and/or SSB-idx) for a link to a single relay (e.g., the link with the best channel condition). The channel state report may also include information for multiple links.

The BS may transmit a data signal to the UE via a second relay of the one or more relays based on the channel state report. For example, the BS may select the second relay from the one or more relays to use for communicating with the UE, based on the channel state report(s), and transmit DL scheduling information to the UE via the second relay, transitioning communication to the second relay, away from the first relay. For example, the link through the second relay may provide better channel conditions than the link through the first relay. In some aspects, where the channel state report includes information for more than one relay, the BS may select the second relay from those for which information is included in the report. In some aspects, the BS may continue using the first relay rather than transitioning to the second relay (e.g., the second relay and the first relay may be the same). For example, the link through the first relay (through which the BS and UE are already connected) may provide the best channel condition (as determined based on the channel state report), or the link through the second relay may be unavailable. In some aspects, the BS may also randomly select a relay to transmit the data signal on (e.g., when a link through the second relay is unavailable), or transmit data directly to the UE.

In some aspects, a UE rather than a BS may select a relay to transition communications over to. This may be appropriate in situations where the BS is unaware of time constraints the data to be transmitted by the UE may have (e.g., survival time requirements or other time-stringent requirements). For instance, the UE may receive from the BS, via one or more relays, a channel state report including channel measurement information (similar to the channel state report described above) associated with the one or more relays. The measurement information in the channel state report may include channel conditions for links through relays that may be available to the UE for communicating with the BS. The measurement information may have been obtained by the BS following a similar process to that described above. That is, the BS may have scheduled the relays to transmit DL reference signals to the UE based on which the UE may perform channel measurement, and/or scheduled the UE to transmit UL references to the relays based on which the relays may perform channel measurement. The relays may then have transmitted channel state reports to the BS, based on which the BS may have prepared the channel state report it transmits to the UE.

The UE may receive, from the BS via a first relay of the one or more relays (e.g., the relay through which the UE and BS are connected), an indication of one or more uplink resources associated with the one or more relays. The UE may then transmit, to the BS via a second relay of the one or more relays using an uplink resource of the one or more uplink resources, a first data signal, where the second relay is based on the channel state report. The UE may select the second relay through which to communicate with the BS based on the channel state report (e.g., the UE may select the relay associated with the best channel condition).

In some aspects, each uplink resource indicated by the BS may correspond to a specific relay. For example, there may be the same number of uplink resources (e.g., time-frequency resources) indicated as the number of relays. The UE can use the uplink resource corresponding to a relay to communicate with or through the relay. In some aspects, transmitting the communication signal includes transmitting the communication signal in the uplink resource corresponding to the second relay. For example, a relay may monitor its corresponding uplink resource to detect a transmission from the UE, and the UE may identify a relay as being the second relay by transmitting the communication signal using the corresponding uplink resource. The BS may indicate to each relay a UE ID (e.g., a C-RNTI) associated with its corresponding uplink resource, which the relay may use to identify the UE selecting the relay. In some aspects, the UE 115 may transmit, to the second relay, a communication signal including an indication of the UE ID (e.g., instead of or in addition to having the BS indicate the UE ID).

In some aspects, each relay of the one or more relays may be associated with a resource pool (including a set of time-frequency resources occupying one or more symbols in time and one or more subcarriers in frequency), and the UE may transmit the communication signal using a resource within a first resource pool associated with the second relay. For example, the BS may schedule different resource pools for each relay (e.g., one resource pool for each relay). The UE may use resources within the resource pool associated with the second relay (e.g., the selected relay) to transmit data to or through the relay. Each resource pool may include an access control. For example, the access control may be an admission threshold based on a priority or a random number. In some aspects, transmitting the communication signal using the resource within the first resource pool is further based on a priority associated with the first data signal satisfying the threshold. For example, the relay or BS may grant the UE access to a corresponding resource pool of the relay by indicating an admission threshold (e.g., priority threshold) for the resource pool. The UE may compare the priority (traffic priority) of the first data signal to the admission threshold of the resource pool and may transmit the first data signal using a resource from the resource pool if the priority associated with the first data signal is equal or greater than the admission threshold. In some aspects, transmitting the communication signal in the resource within the first resource pool is based on a random number generated by the UE satisfying a threshold. For example, the UE may generate a random number and may then compare the random number to the threshold. The UE may transmit the first data signal using a resource from the resource pool if the random number is greater than the threshold.

Aspects of the present disclosure can provide several benefits. For example, having the BS and/or the UE select a relay (or a link that runs through multiple relays) from among multiple available relays, rather than communicating through multiple links passing through multiple relays, may reduce the number of UEs connected to a given relay. This may reduce number of UEs communicating through each relay, which may result in reduced resource utilization at each relay, while still providing a suitable link for the BS and UE communicate over based on the channel conditions of the links passing through the available relays.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, network 100 may be an integrated access backhaul (IAB) network. IAB may refer to a network that uses a part of radio frequency spectrum for backhaul connection of BSs (e.g., BSs 105) instead of optical fibers. The IAB network may employ a multi-hop topology (e.g., a spanning tree) to transport access traffic and backhaul traffic. For instance, one of the BSs 115 may be configured with an optical fiber connection in communication with a core network. The BS 105 may function as an anchoring node (e.g., a root node) to transport backhaul traffic between a core network and other BSs 105 in the IAB network. In some other instances, one BS 105 may serve the role of a central node in conjunction with connections to a core network. And in some arrangements, BSs 105 and the UEs 115 may be referred to as relay nodes in the network.

Figure 2:
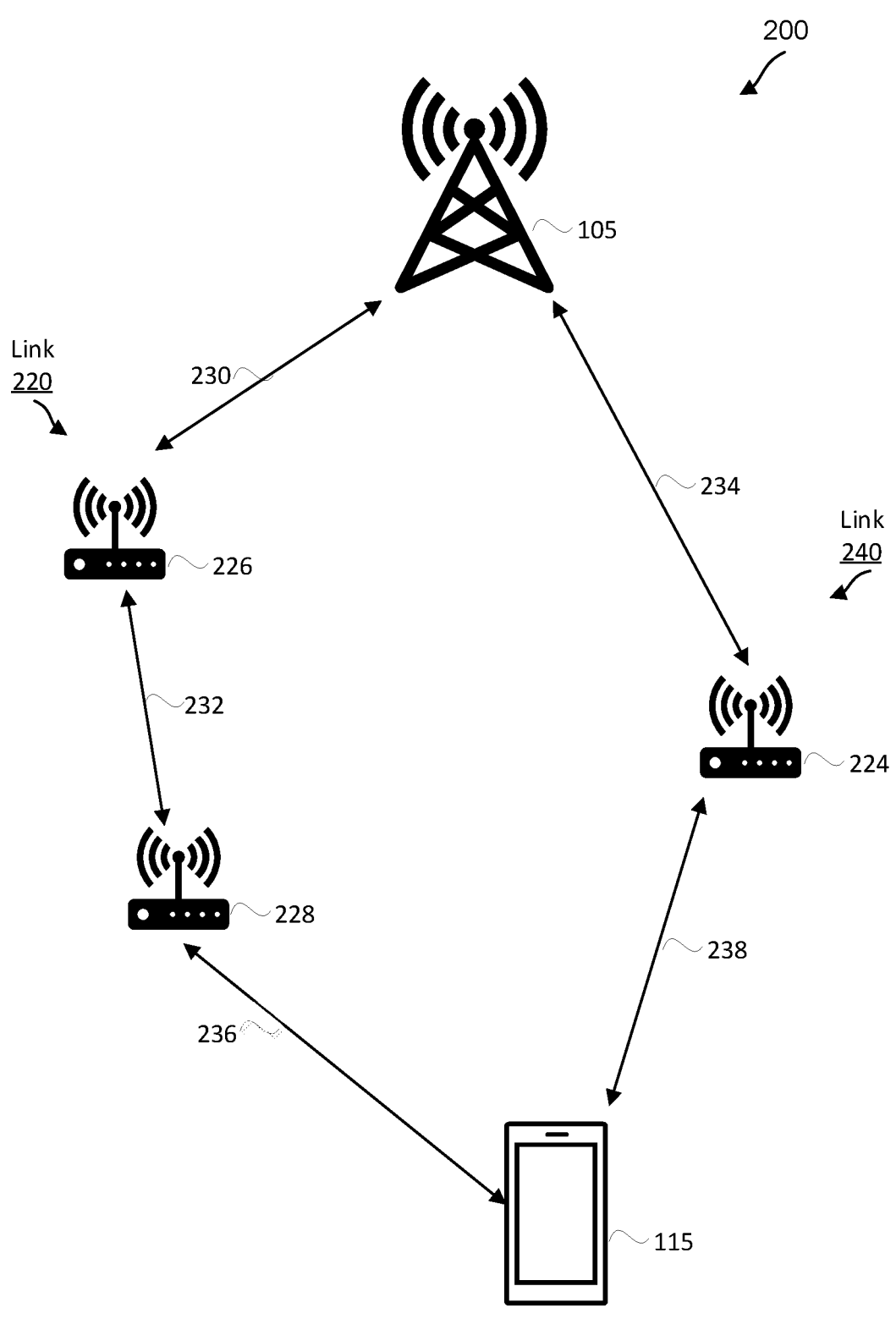
FIG. 2 illustrates communication scenario according to some aspects of the present disclosure.

FIG. 2 illustrates communication scenario 200 that includes relays 224, 226, and 228 according to some aspects of the present disclosure. The scenario 200 may correspond to a communication scenario in the network 100. Each relay 224, 226, and 228 may be a wireless communication device, for example, a UE 115. For simplicity, scenario 200 includes a BS 105, three relays 224, 226, and 228, and a UE 115, but a greater or fewer number of each type of device may be supported. Two different communication links 220 (which includes links 230, 232, and 236) and 240 (which includes links 234 and 238) are shown originating from and terminating at UE 115. Communication between the BS 105 and the UE 115 may be more effective over links 220 and 240 than over a direct connection between the two devices when, for example, UE 115 is distant from the BS 105 (e.g., outside or near the boundary of the coverage area of BS 105), and relay 224, or relays 226 and 228, is/are between the BS 105 and the UE 115. Link 220 connects UE 115 to BS 105 (in three hops) through relays 228 and 226, and link 240 connects UE 115 to BS 105 (in two hops) through relay 224. Data transmitted from the UE 115 (in an upstream direction) on link 220 travels through link 236 to relay 228, which then transmits it over link 232 to relay 226, which finally transmits it over link 230 to BS 105. Data transmitted from the UE 115 (in an upstream direction) to the BS 105 over link 240 travels through link 238 to relay 224, which then transmits it to BS 105 over link 234. UE 115 may transmit data over one or both links 220 and 240. Similarly, BS 105 may transmit data (in a downstream direction) to UE 115 over link(s) 220 and/or 240, with the data flowing to the UE 115 in reverse order from the upstream transmission. Data transmitted by the UE 115 to the BS 105 via the relays 224 and/or the relays 226 and 228 may be handled by each relay at the physical layer, forwarding the data to the BS 105 (in some instances with additional headers or information) without involving other layers (e.g., the medium access control (MAC) layer).

In some aspects, a UE 115 may communicate with a BS 105 using both link 220 and link 240 simultaneously. Because additional UEs 115 (not illustrated) may communicate via relays 224, 226, and/or 228, each relay transmitting data between the UEs 115 and the BS 105 may combine data from multiple UEs 115, resulting in increased resource consumption. Aspects of the present disclosure enable a BS 105 and UE 115 to select between different links (e.g., between links 220 and 240) based on, for example, which link provides better channel conditions, rather than using multiple links simultaneously. This may reduce the number of UEs 115 each relay (e.g., relays 224, 226, and/or 228) is in communication with and reduce resource consumption at the relay.

Figure 3:
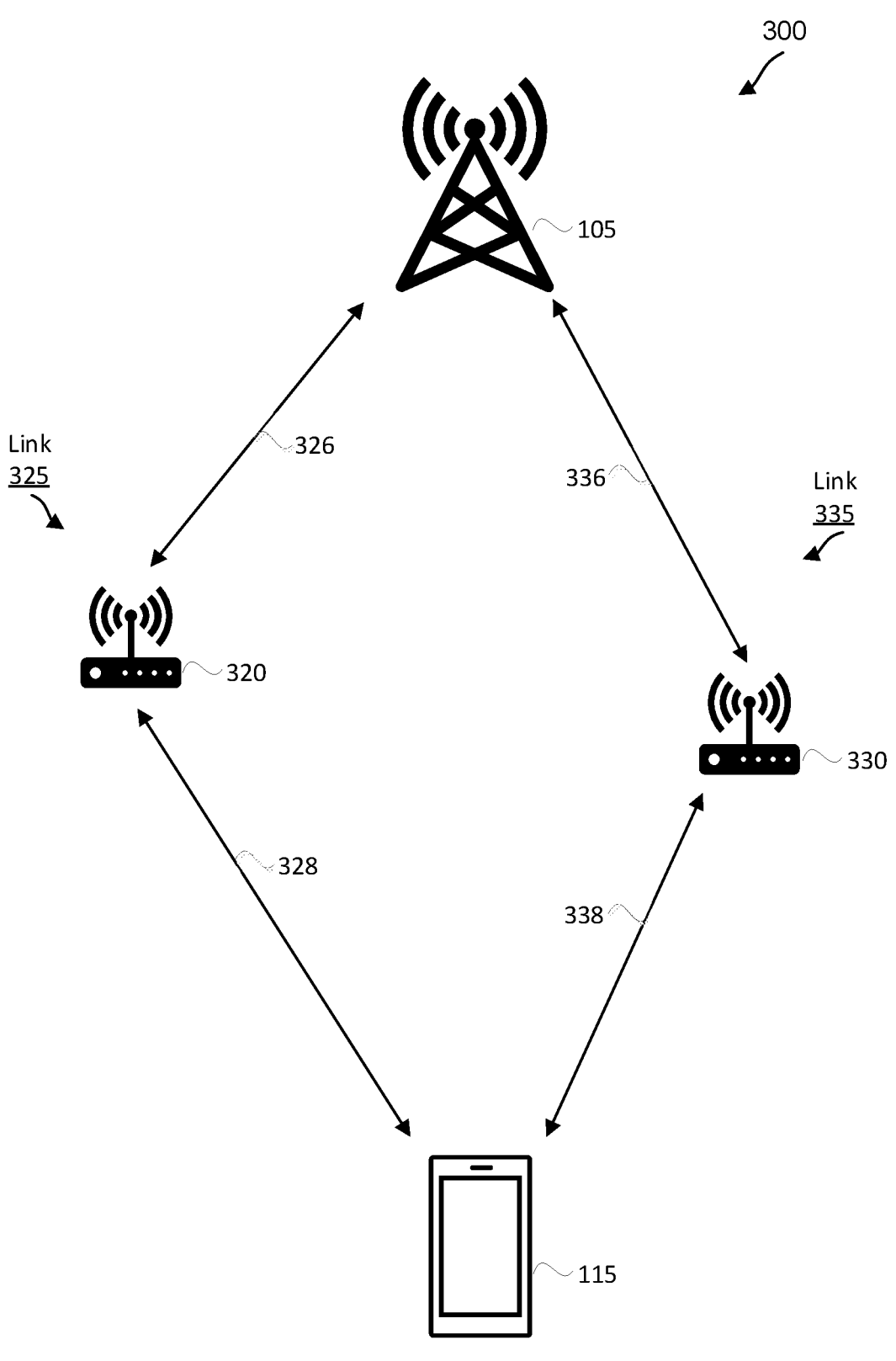
FIG. 3 illustrates a communication scenario according to some aspects of the present disclosure.

FIG. 3 illustrates a communication scenario 300 according to some aspects of the present disclosure. The scenario 300 may correspond to a communication scenario in the network 100. As illustrated, communication scenario 300 includes a BS 105, a UE 115, and two relays, 320 and 330. The relays 320 and 330 may be wireless communication devices configured to operate as relays to assist coverage-limited UEs 115 communicate with the BS 105. In some instances, the relays 320 and 330 can be UEs similar to the UE 115. The BS 105 and UE 115 may communicate via relay 320 using link 325 (which includes links 326 and 328), and/or via relay 330 using link 335 (which includes links 336 and 338). While only two relays 320 and 330 are illustrated, additional relays may be used to perform the methods described herein (e.g., methods 400 of FIG. 4, 500 of FIG. 5, and 700 of FIG. 7).

Figure 4:
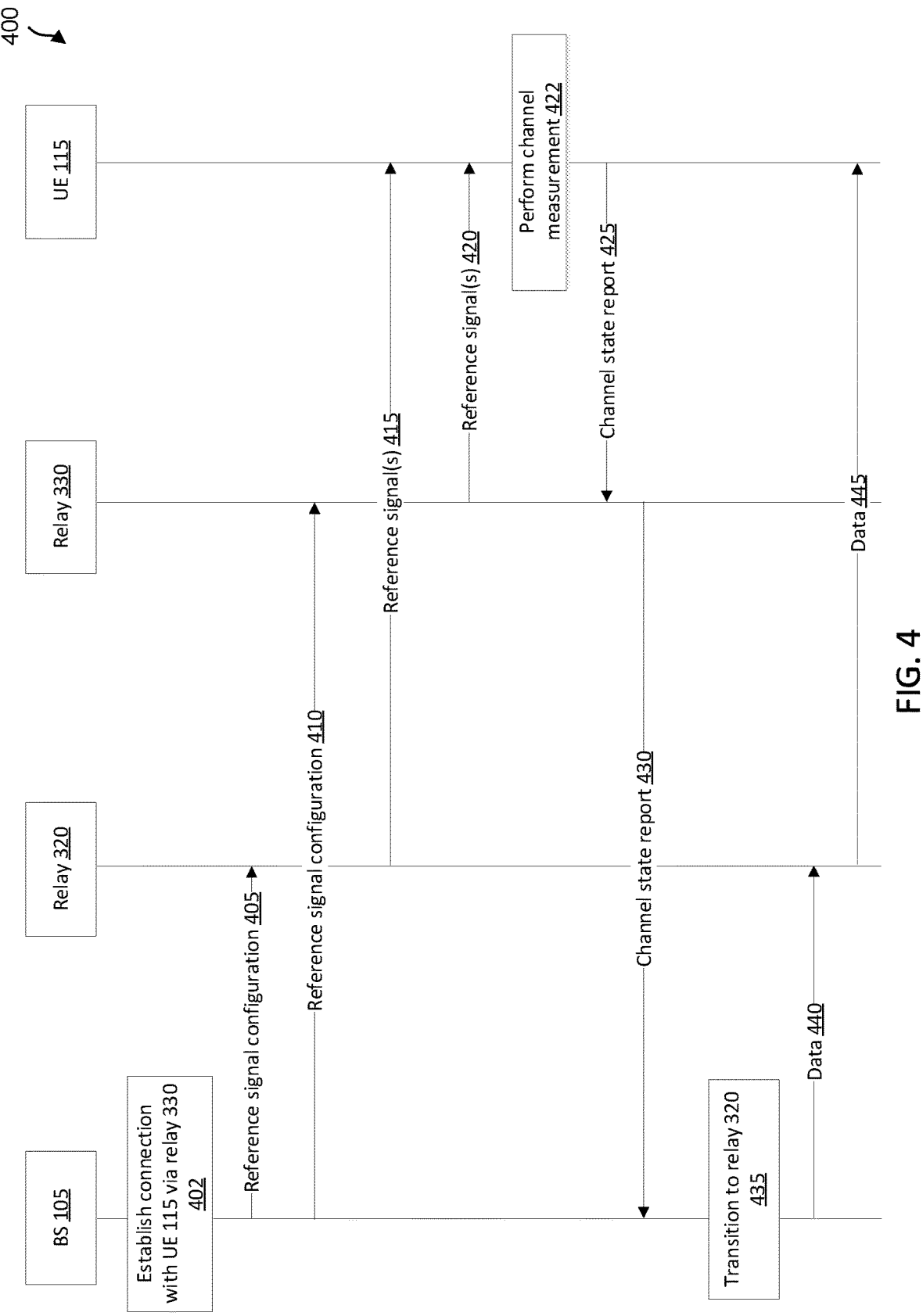
FIG. 4 is a sequence diagram illustrating a communication method according to some aspects of the present disclosure.

FIG. 4 is a sequence diagram illustrating a communication method 400 according to some aspects of the present disclosure. The communication method 400 may be performed by a BS 105, a UE 115, and two relays (320 and 330), communicating under scenario 300 as illustrated in communication scenario 300 of FIG. 3.

At action 402, BS 105 may establish a connection (e.g., an RRC connection) with UE 115 via relay 330. For example, UE 115 may be outside or near the boundary of the coverage area of BS 105, and relay 330 may be between BS 105 and UE 115.

At action 405, BS 105 may transmit a reference signal configuration to relay 320. The reference signal configuration may indicate one or more reference signal resources (e.g., time-frequency resources) for transmitting DL reference signals to the UE 115.

At action 410, BS 105 may transmit a transmit a reference signal configuration to relay 330. The reference signal configuration may indicate one or more reference signal resources (e.g., time-frequency resources) for transmitting DL reference signals to the UE 115.

At action 415, relay 320 may transmit a reference signal to UE 115 in a reference signal resource of the one or more reference signal resources included in the reference signal configuration transmitted by the BS 105 at action 405. The reference signal may be, for example, a CSI-RS and/or an SSB with predetermined signal waveforms known to the UE 115.

At action 420, relay 330 may transmit a reference signal to UE 115 in a reference signal resource of the one or more reference signal resources included in the reference signal configuration transmitted by the BS 105 at action 405. The reference signal may be, for example, a CSI-RS and/or an SSB.

At action 422, UE 115 may perform channel measurement based on the reference signals received from relays 320 and 330. The UE 115 may determine an RSRP and/or SINR indicating the channel quality of the link between the UE 115 and each relay 320 and 330. The UE may also determine a CRI and/or and SSB-idx associated with the channel measurements. For instance, when a DL reference signal is a CSI-RS, CRI may indicate which resource of the one or more resources a channel measurement corresponds to. Additionally, different resources of the one or more resources may be associated with different beam directions. For example, each of the relay 320 or relay 330 may transmit a CSI-RS (DL reference signal) in a certain resource using a certain transmission beam. Alternatively, when a DL reference signal is an SSB, an SSB-idx may indicate which SSB a channel measurement corresponds to. Additionally, SSBs with different SSB indices may be associated with different beam directions. For example, each of the relay 320 or relay 330 may transmit an SSB with a certain SSB-idx using a certain transmission beam. Accordingly, the CRI and/or SSB-idx can indicate the best DL beam for each relay 320 and 330.

At action 425, the UE 115 may transmit a channel state report including the channel measurement information determined at action 422 (e.g., RSRP, SINR, CRI, and/or SSB-idx values). The UE 115 may transmit the channel state report via the relay 330 (which the UE 115 is connected to). In some aspects, the UE 115 may only include the channel measurement information for the relay providing the link with the best channel conditions. For example, if relay 320 provides better channel conditions, the UE 115 may only include the RSRP, SINR, CRI, and/or SSB-idx for relay 320. In an example, the UE 115 may include in the channel state report an RSRP and a CRI indicating a resource where the UE 115 measured the RSRP. Additionally or alternatively, the UE 115 may include in the channel state report a RSRP and an SSB-idx indicating which SSB the UE 115 used to obtain the RSRP. The CRI and/or SSB-idx can indicate the best DL beam for the UE 115.

At action 430, relay 330 may transmit the channel state report received from the UE 115 at action 425 to the BS 105.

At action 435, BS 105 may transition communications with the UE 115 over to relay 320 based on the channel state report it received at action 430. In other words, BS 105 may stop communicating with UE 115 via relay 330 and instead begin communicating with UE 115 via relay 320. For example, the UE 115 may have determined at action 422 that relay 320 would provide better channel conditions than relay 330 and included channel measurement information for relay 330 in the channel state report. In some cases, rather than transitioning to relay 330 as illustrated, BS 105 may continue communicating with UE 115 via relay 330 (e.g., had the UE 115 determined at action 422 that relay 330 provides better channel conditions).

At action 440, BS 105 may transmit data (e.g., PDSCH data and/or PDCCH downlink control information (DCI)) to relay 320 intended for UE 115, based on the channel state report (e.g., based on the channel state report indicating relay 320 would provide better channel conditions).

At action 445, relay 320 may forward the data received from BS 105 to UE 115.

In some aspects, the BS 105 may switch between the relay 320 and 330 for DL communication with the UE 115, for example, as the channel condition varies. As an example, at a certain period of time, the link 325 (via the relay 320) may provide a better channel quality (e.g., a higher RSRP, SNR, and/or SINR) than the link 335 (via the relay 330), and thus the BS 105 may select the relay 320 for communication with UE 115. At a later time period, the link 335 (via the relay 330) may provide a better channel quality (e.g., a higher RSRP, SNR, and/or SINR) than the link 325 (via the relay 320), and thus the BS 105 may switch back to the relay 330 for communication with UE 115. Accordingly, the BS 105 may select a most suitable link for communication with the UE 115 at any given time adapting to channel conditions.

Figure 5:
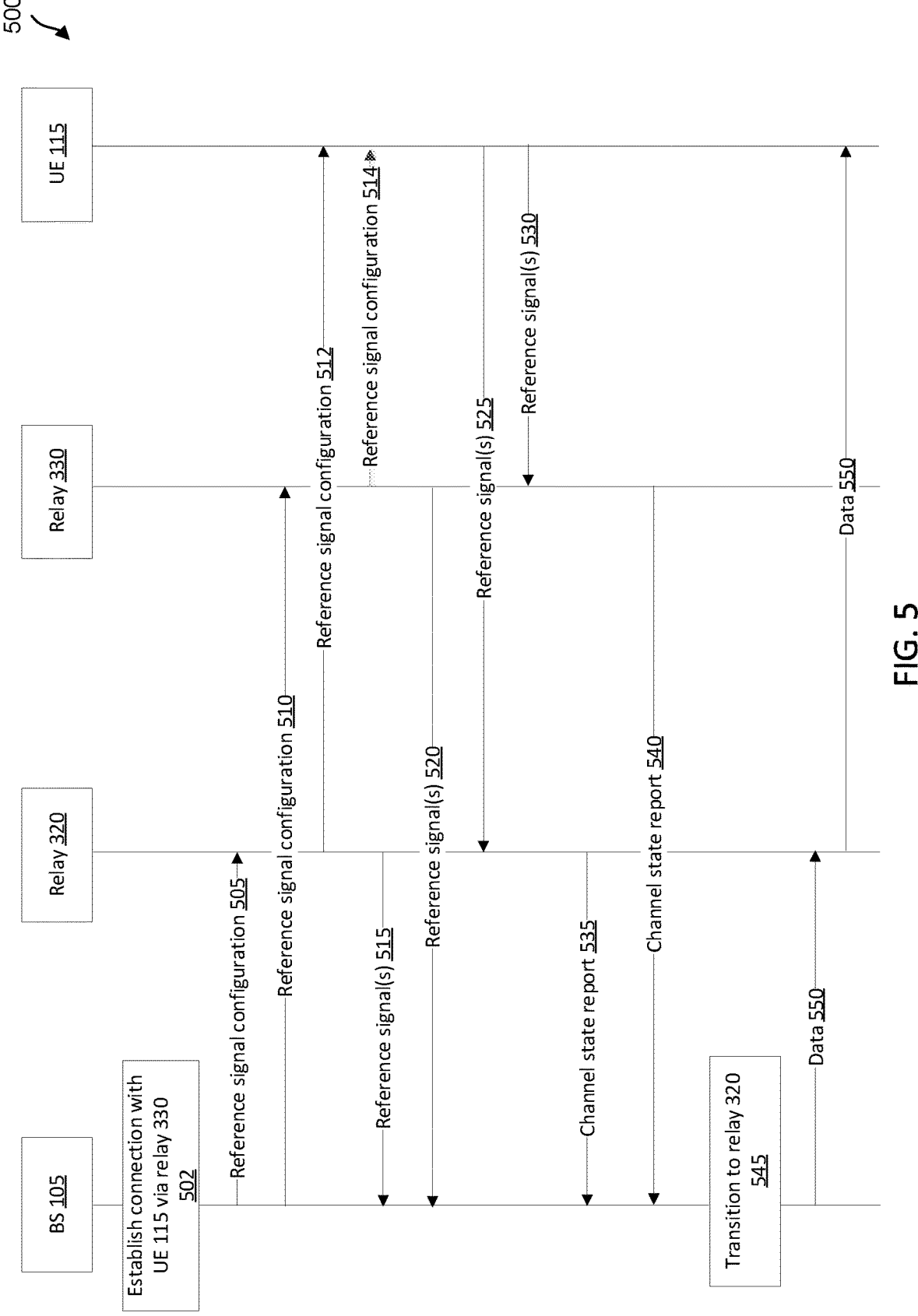
FIG. 5 is a sequence diagram illustrating a communication method according to some aspects of the present disclosure.

FIG. 5 is a sequence diagram illustrating a communication method 500 according to some aspects of the present disclosure. The communication method 500 may be performed by a BS 105, a UE 115, and two relays (320 and 330), communicating under scenario 300 as illustrated in FIG. 3. Communication method 500 describes relay selection based on UL reference signals and may be used in conjunction with communication method 400, which describes relay selection based on DL reference signals.

At action 502, the BS 105 may establish a connection with the UE 115 via relay 330. For example, UE 115 may be outside or near the boundary of the coverage area of BS 105, and relay 330 may be positioned between BS 105 and UE 115.

At action 505, BS 105 may transmit a reference signal configuration to relay 320. The reference signal configuration may indicate one or more reference signal resources (e.g., time-frequency resources) for transmitting UL reference signals (e.g., SRSs) from the UE 115 to the relay 320, and from the relay 320 to the BS 105.

At action 510, BS 105 may transmit a reference signal configuration to relay 330. The reference signal configuration may indicate one or more reference signal resources (e.g., time-frequency resources) for transmitting UL reference signals (e.g., SRSs). For example, the one or more resources may include a first resource for the UE 115 to transmit a UL reference signal to the relay 330 and a second resource for the relay 330 to transmit a UL reference signal to the BS 105.

At action 512, relay 320 may transmit a reference signal configuration to UE 115. The reference signal configuration may be based on the reference signal configuration transmitted by the BS 105 to the relay 320, and may indicate a reference signal resource for transmitting a UL reference signal (e.g., an SRS) from the UE 115 to the relay 320.

At action 514, relay 330 may transmit a reference signal configuration to UE 115. The reference signal configuration may be based on the reference signal configuration transmitted by the BS 105 to the relay 330, and may indicate a reference signal resource for transmitting a UL reference signal (e.g., an SRS) from the UE 115 to the relay 330.

At action 515, relay 320 may transmit a UL reference signal to the BS 105 in a reference signal resource indicated by the reference signal configuration transmitted to the relay 320 by the BS 105.

At action 520, relay 330 may transmit a UL reference signal to the BS 105 in a reference signal resource indicated by the reference signal configuration transmitted to the relay 330 by the BS 105.

At action 525, UE 115 may transmit a UL reference signal to the relay 320 in a reference signal resource indicated by the reference signal configuration transmitted by the relay 320 (based on the reference signal configuration transmitted by the BS 105 to the relay 320) to the UE 115.

At action 530, UE 115 may transmit a UL reference signal to the relay 330 in a reference signal resource indicated by the reference signal configuration transmitted by the relay 330 (based on the reference signal configuration transmitted by the BS 105 to the relay 330) to the UE 115.

At action 535, relay 320 may transmit a channel state report to the BS 105. The channel state report may include channel measurement information determined by the relay 320 based on the UL reference signal transmitted to it by the UE 115 and may include an RSRP and/or SINR indicating a channel condition. In some instances, the measurement information may also include a CRI and/or SSB-idx indicating the best beam for communicating between the relay 320 and the UE 115. For instance, the relay 320 may receive a report indicating the CRI and/or SSB-idx for the best DL beam direction from the UE 115 (as discussed above in the method 400 with reference to FIG. 4) and may forward the CRI and/or SSB-idx to the BS 105 as part of the channel state report including the UL measurements. In some instances, the relay 320 may receive the UL reference signal (e.g., at action 525) from the same beam direction as the best DL beam direction. In some instances, the measurement information may also include an indicator indicating which of the one or more reference signal resources the relay 320 obtained a channel measurement from. Similar to the method 400 discussed above, different resources of the one or more resources may be associated with different beam directions, and thus the indication of resource may also provide beam information associated with the channel measurement. For example, a best RSRP measured from a certain resource may also indicate a beam direction associated with the certain resource is a best direction for communication.

At action 540, relay 330 may transmit a channel state report to the BS 105. The channel state report may include channel measurement information determined by the relay 330 based on the UL reference signal transmitted to it by the UE 115 and may include an RSRP and/or SINR indicating a channel condition. Similarly, the measurement information may also include an indicator indicating which of the one or more reference signal resources the relay 320 obtained a channel measurement from.

At action 545, BS 105 may transition communication between itself and UE 115 to relay 320 based on the channel state reports received from the relay 320 and 330. In other words, BS 105 may stop communicating with UE 115 via relay 330 and instead begin communicating with UE 115 via relay 320. For example, BS 105 may determine based on the channel state reports that relay 320 may provide a better channel condition than BS 330. The determination may be further based on the results of channel measurement performed by the BS 105 based on the UL reference signals transmitted to it by relays 320 and 330 at actions 515 and 520 respectively. In some cases, rather than transitioning to relay 320 as illustrated, the BS 105 may continue communicating with the UE 115 via relay 330 (e.g., if BS 105 determined that relay 330 provided a better channel condition than relay 320).

At action 550, BS 105 may transmit data to relay 320 intended for UE 115, based on the channel state report (e.g., based on the channel state report indicating relay 320 would provide better channel conditions).

At action 555, relay 320 may forward the data received from BS 105 to UE 115.

In some aspects, the BS 105 may switch between the relay 320 and 330 for UL communication with the UE 115, for example, as channel condition varies. As an example, at a certain period of time, the link 325 (via the relay 320) may provide a better channel quality (e.g., a higher RSRP, SNR, and/or SINR) than the link 335 (via the relay 330), and thus the BS 105 may select the relay 320 for communication with UE 115. At a later time period, the link 335 (via the relay 330) may provide a better channel quality (e.g., a higher RSRP, SNR, and/or SINR) than the link 325 (via the relay 320), and thus the BS 105 may switch back to the relay 330 for communication with UE 115. Accordingly, the BS 105 may select a most suitable link for communication with the UE 115 at any given time adapting to channel conditions.

Further, in some aspects, the BS 105 may switch between the relay 320 and 330 for UL and DL communications. As an example, the BS 105 may utilize the link 335 (via the relay 330) for DL communication with the UE 115 based on the link 335 providing the a better channel quality than the link 325 (indicated by DL channel measurements from the UE 115, the relay 320, and/or relay 330), and may utilize the link 325 (via the relay 320) for UL communication with the UE 115 based on the link 325 providing the a better channel quality than the link 335 (indicated by UL channel measurements from the BS 105, the relay 320, and/or relay 330).

Further, in some aspects, the UE 115, the relay 320, and/or the relay 330 can transmit a combined channel report to the BS 105, for example, including a DL channel state report (with channel measurements from DL reference signals as discussed with reference to FIG. 4) and a UL channel state report (with channel measurements from UL reference signals as discussed above with reference to FIG. 5).

Figure 6:
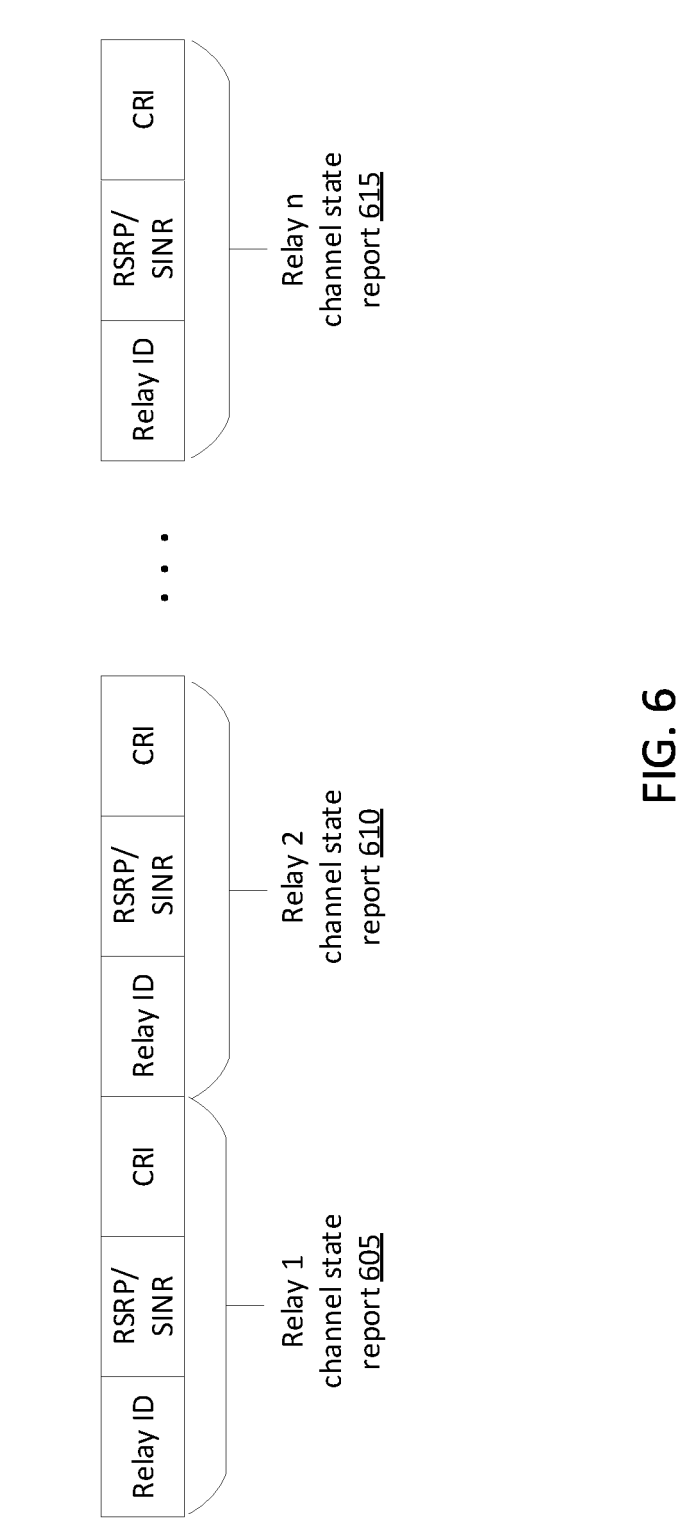
FIG. 6 illustrates a communication scheme according to some aspects of the present disclosure.

FIG. 6 illustrates a communication scheme 600 according to some aspects of the present disclosure. The communication scheme 600 may be employed by a BS 105 and a UE 115 with access to one or more relays, for example, in the scenarios and methods described in FIGS. 2-5 and 8-12. The communication scheme 600 may be used by a relay (e.g., the relay 320, 330, or a UE 115 configured to act as a relay) when transmitting a channel state report to a BS 105. Each relay being considered for communication between the BS 105 and UE 115 may transmit a channel state report (based on, for example, a channel state report transmitted to the relay by the UE 115) to the BS 105. Each channel state report may include a relay ID identifying the relay transmitting the report, the RSRP and/or SINR received from the UE 115 (in the channel state report transmitted by the UE, based on the link between the relay and the UE 115), and the CRI indicating the best beam for communication between the relay and the UE 115 (also included in the channel state report transmitted by the UE). For example, relay 1 may transmit channel state report 605 including its own relay ID and the channel measurement information (RSRP, SINR, and/or CRI) it received from UE 115, relay 2 may transmit channel state report 610 including its own relay ID and the channel measurement information received it from UE 115, and so on for every relay through relay n (where n is the number of relays under consideration), which may transmit channel state report 615 including its own relay ID and the channel measurement information it received from UE 115. Each channel state report (e.g., channel state reports 605, 610, and 615) may be transmitted by the corresponding relay to the BS 105 over PUSCH.

Figure 7:
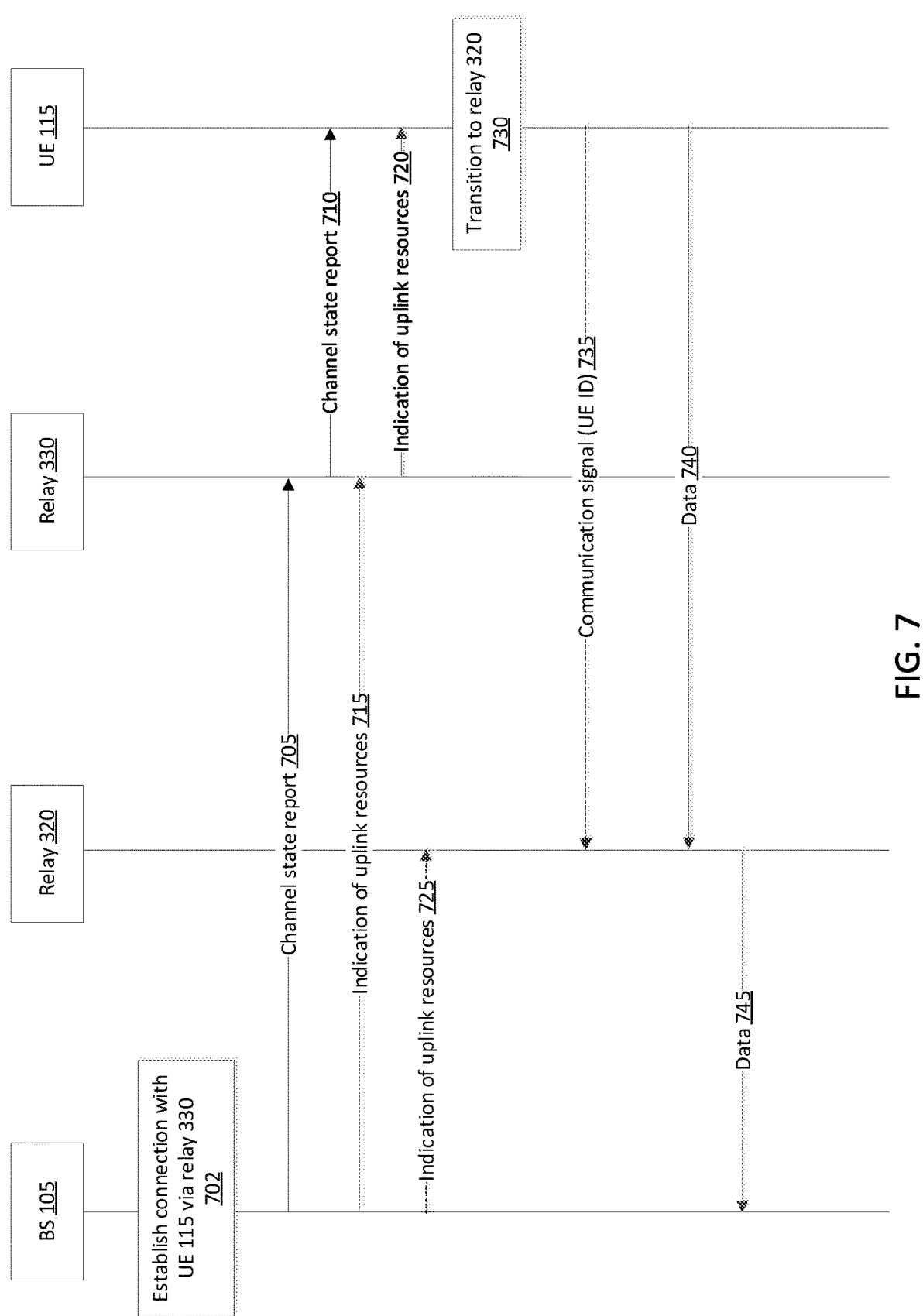
FIG. 7 is a sequence diagram illustrating a communication method according to some aspects of the present disclosure.

FIG. 7 is a sequence diagram illustrating a communication method 700 according to some aspects of the present disclosure. The communication method 700 may be performed by a BS 105, a UE 115, and two relays (320 and 330), communicating under scenario 300 as illustrated in FIG. 3. In communication method 700, the UE 115 rather than the BS 105 may determine whether to transition communication to a different relay. For example, data to be transmitted by the UE 115 may have time stringent requirements (e.g., a survival time requirement) of which the BS 105 is unaware, giving UE 115 more information on which to base a transition to a different relay.

At action 702, the BS 105 may establish a connection with the UE 115 via relay 330. For example, UE 115 may be outside or near the boundary of the coverage area of BS 105, and relay 330 may be between BS 105 and UE 115.

At action 705, the BS 105 may transmit a channel state report to relay 330. The channel state report may be based on channel measurements performed by the BS 105, the relays 320 and 330, and the UE 115. For example, similar to what is described in FIGS. 5-6, the BS may have transmitted DL reference signals (e.g., CSI-RS and/or SSBs) to the UE 115 through the relays 320 and 330 and scheduled the UE 115 and relays 320 and 330 to transmit upstream reference signals (e.g., SRSs). Each device may have performed channel measurement based on the reference signal(s) it received and provided the BS 105 with a channel state report based on the channel measurements. The BS 105 may prepare its own channel state report based on those received from the relays 320 and 330 and the UE 115 (through the relays 320 and 330) and based on its own measurements and transmit that channel state report at this action.

At action 710, the relay 330 may transmit the channel state report received from the BS 105 to the UE 115.

At action 715, the BS 105 may transmit an indication of uplink resources associated with relays 320 and 330 to the relay 330. In some aspects, the number of uplink resources may equal the number of relays, and each uplink resource may be associated with a relay. For example, an uplink resource may be associated with relay 320, and an uplink resource may be associated with relay 330. Each uplink resource may be also associated with a UE ID identifying the UE 115 (e.g., a cell-radio network temporary identifier (C-RNTI)). Each relay 320 and 330 may monitor the uplink resource associated with it for transmissions, which the relays can detect originated at UE 115 based on the uplink resource used to transmit the data and the UE ID associated with the uplink resource.

At action 720, relay 330 may transmit to the UE 115 the indication of uplink resources received by the relay 330 at action 715.

At action 725, the BS 105 may optionally transmit an indication of uplink resources to relay 320. The indication may be the same as that transmitted to relay 330 at action 715, or it may contain an indication of fewer uplink resources. For example, the indication transmitted at this step may only include an indication of the uplink resource associated with relay 320 and the UE ID associated with it (e.g., the UE ID of UE 115).

At action 730, the UE 115 may transition to relay 320 based on the channel state report received at action 710. For example, the UE 115 may determine that relay 320 provides a better channel condition than relay 330. In some aspects, the UE 115 may instead continue communicating via relay 330 (e.g., if it determines based on the channel state report that relay 330 provides a better channel condition).

At action 735, UE 115 may optionally transmit a communication signal including the UE ID associated with UE 115 to relay 320 to indicate to relay 320 that relay 320 has been selected for communication with BS 105. For example, in some aspects, the BS 105 may not have indicated to the relays 330 and 320 (at actions 715 and 720, respectively) the UE ID associated with UE 115, and the relay 320 may not immediately associate a transmission from the UE 115 on the uplink resource associated with the relay 320 as being from the UE 115 associated with the UE ID. In this case, the UE 115 may transmit a communication signal indicating the UE ID on the uplink resource associated with the relay 320.

At step 740, UE 115 transmits a data signal (e.g., a PUSCH signal carrying data and/or a PUCCH signal carrying uplink control information (UCI)) to relay 320 intended for BS 105.

At action 745, relay 320 transmits the data signal received from UE 115 at action 740 to BS 105. The relay 320 may include the UE ID of UE 115 in the transmission. For example, the relay 320 may determine the UE ID based on the uplink resource it received the data transmission on, or the UE 115 may have transmitted the UE ID (as part of the communication signal at action 735) to the UE 115.

In some aspects, rather than transmitting an indication of uplink resources at action 715 and configuring the uplink resources so that each resource is associated with a relay (320 or 330), the BS 105 may instead configure a resource pool for each relay (e.g., one pool for relay 320 and one pool for relay 330). A resource pool may include a set of time-frequency resources occupying one or more symbols in time and one or more subcarriers in frequency, where the set of resources may include resources that are disjoint in time and/or in frequency and/or resources that are contiguous in time and/or in frequency. The UE 115 may select a relay (320 or 330) by accessing a resource in the resource pool associated with the relay. Each resource pool may include an access control. For example, the access control may be an admission threshold based on a priority or a random number. The BS 105 or a relay (320 or 330) may grant the UE 115 access to a corresponding resource pool of the relay by indicating an admission threshold (e.g., priority threshold) for the resource pool. The UE 115 may compare the priority (traffic priority) of the data signal to be transmitted to the admission threshold of the resource pool and may transmit the data signal using a resource from the resource pool if the priority associated with the data signal is equal to or greater than the admission threshold. In some aspects, transmitting the communication signal in the resource within the first resource pool is based on a random number generated by the UE satisfying a threshold. For example, the UE may generate a random number and may then compare the random number to the threshold. The UE may transmit the first data signal using a resource from the resource pool if the random number is greater than the threshold.

Figure 8:
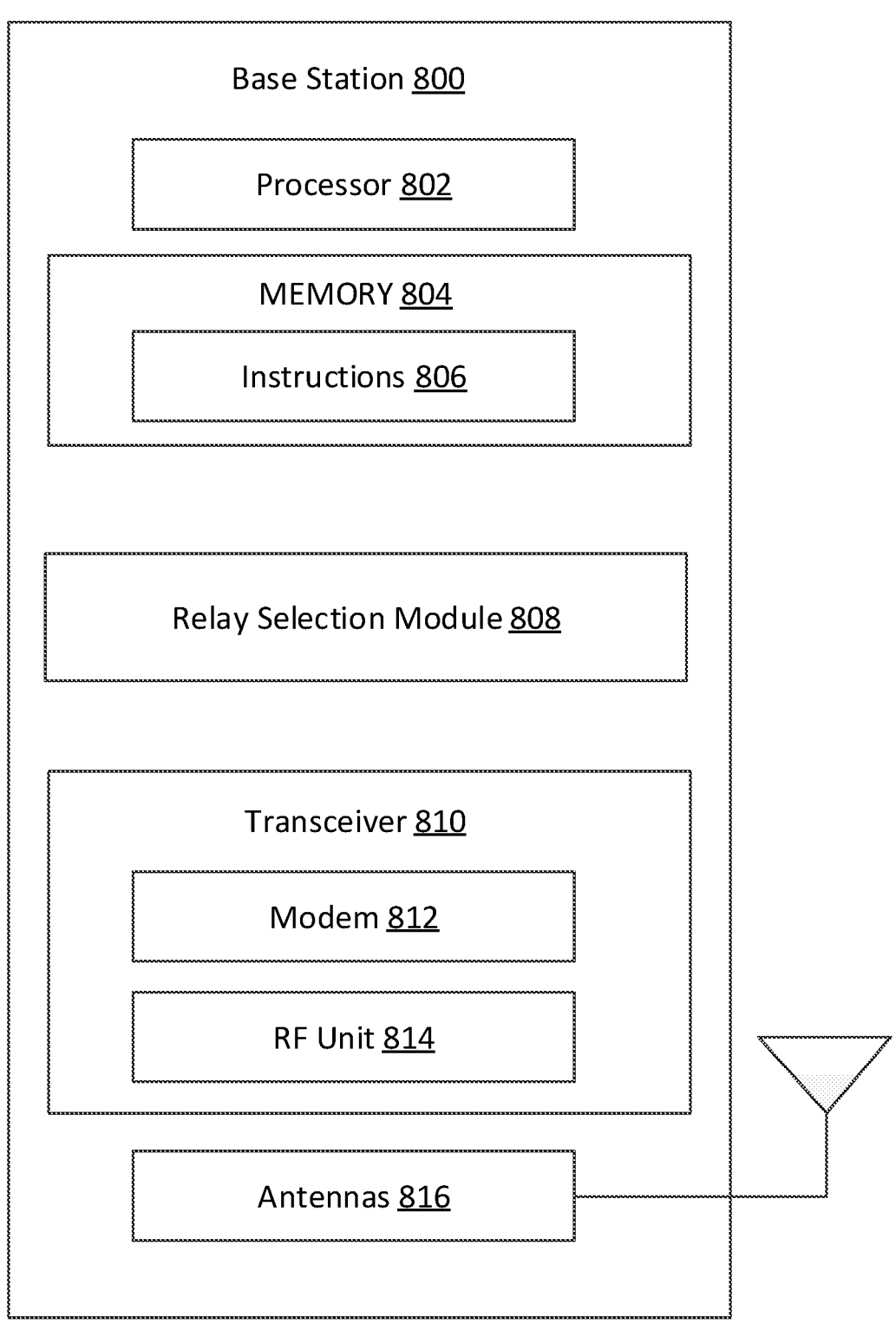
FIG. 8 illustrates a block diagram of a base station according to some aspects of the present disclosure.

FIG. 8 is a block diagram of an exemplary BS 800 according to some aspects of the present disclosure. The BS 800 may be a BS 105 as discussed in FIGS. 1-10 and 12-14. A shown, the BS 800 may include a processor 802, a memory 804, a relay selection module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-10, and 12-14. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The relay selection module 808 may be implemented via hardware, software, or combinations thereof. For example, the relay selection module 808 may be implemented as a processor, circuit, and/or instructions 806 stored in the memory 804 and executed by the processor 802. In some examples, the relay selection module 808 can be integrated within the modem subsystem 812. For example, the relay selection module 808 can be implemented by a combination of software components (e.g., executed by a DSP or a general processor) and hardware components (e.g., logic gates and circuitry) within the modem subsystem 812. The relay selection module 808 may communicate with one or more components of BS 800 to implement various aspects of the present disclosure, for example, aspects of FIGS. 1-10 and 12-14.

For instance, the relay selection module 808 may transmit, to one or more wireless communication devices 900, a reference signal configuration indicating one or more reference signal resources (e.g., time-frequency resources). Each wireless communication device 900 may be configured to operate as a relay. For example, the wireless communication devices 900 may include UEs (e.g., UEs 115) configured to act as relays. The wireless communication devices 900 may be referred to herein as relays for simplicity. The reference signal configuration may include scheduling information that may be used by the relays to transmit reference signals to a UE 115, and by the UE 115 to transmit reference signals to the relays. The BS 800 may already be in communication with the UE 115 (either directly, or through one of the relays). In some aspects, the relays included in the one or more wireless communication devices 900 may be based on the location of the UE 115. For example, the relay selection module 808 may schedule only those relays within a certain distance of the UE 115 to transmit reference signals to the UE (and similarly, the relay selection module 808 may schedule the UE 115 to transmit reference signals only to those same relays). The relay selection module 808 may determine the location of the UE 115 based on, for example, the beam(s) used to communicate with the UE 115. In some aspects, the relay selection module 808 may schedule all of the relays that are among the one or more wireless communication devices 900 to transmit reference signals to the UE 115 and/or schedule the UE 115 to transmit reference signals to each of those relays.

The relay selection module 808 may further be configured to receive, from a first wireless communication device 900 of the one or more wireless communication devices 900 (e.g., from a relay on the link between the UE 115 and the BS 800), a channel state report based on one or more reference signals in the one or more reference signal resources. The channel state report includes channel measurement information for one or more links, each link connecting a wireless communication device of the one or more wireless communication devices to the UE 115. For example, each relay may have transmitted reference signals to the UE 115 in the reference signal resource indicated for that relay in the reference signal configuration. The references signals may include CSI-RSs and/or SSBs. The measurement information included in the channel state report may be based on measurements performed by the UE 115 (e.g., based on the CSI-RSs and SSBs), reflecting the DL channel condition of the link between a relay and the UE 115.

In some aspects, additional channel state reports may be received by the selection module 808 from one or more of the wireless communication devices 900, reflecting the uplink conditions of the link between a relay and the UE 115. For example, the UE 115 may transmit an SRS to each relay in reference signal resources indicated in the reference signal configuration. Each relay may perform measurements based on the SRS(s) transmitted to it, and transmit a channel state report including measurement information to the selection module 808 (e.g., via PUSCH).

In some aspects, the channel measurement information may include at least one of a reference signal receive power (RSRP), a signal-to-interference-plus-noise ratio (SINR) (e.g., a level 1 SINR (L1-SINR)), a CSI-RS resource indicator (CRI), or a synchronization signal block (SSB) index for each link of the one or more links. The RSRP and SINR may be used to indicate the channel quality, and the CRI and SSB may be used to indicate a transmission beam for communicating with the UE 115. As illustrated in FIG. 6, the channel state report may also include one or more relay IDs identifying the relays to which the channel measurement information (or particular values within the channel measurement information) correspond.

In some aspects, a channel state report may include information for fewer links than a number of wireless communication devices in the one or more wireless communication devices. For example, the channel state report may include information (e.g., RSRP, SINR, CRI, and/or SSB-idx) for a link to a single relay (e.g., the link with the best channel conditions). The channel state report may also include information for multiple relays.

The relay selection module 808 may further be configured to transmit, to the UE 115 via a second wireless communication device of the one or more wireless communication devices based on the channel state report, a data signal (e.g., a PUSCH signal carrying data and/or a PUCCH signal carrying uplink control information (UCI)). For example, the relay selection module 808 may select a second relay from the one or more relays to use for communicating with the UE 115, based on the channel state report. The channel state report may include measurement information associated with a different relay than the first relay (the one currently used by the BS 800 to communicate with the UE 115). The relay selection module 808 may transition communications to the second relay, away from the first relay (e.g., if the second relay provides a better channel condition). In some aspects, where the channel state report includes information for more than one relay, the relay selection module 808 may select the second relay from those for which information is included in the report. In some aspects, the relay selection module 808 may keep using the first relay rather than transitioning to the second relay, and/or the second relay and the first relay may be the same. For example, the link through the current relay may provide the best channel condition (as determined based on the channel state report), or the link through the second relay may be unavailable.

In some aspects, the relay selection module 808 may be configured to schedule a resource pool for the one or more relays, each resource pool corresponding to one relay. The relay selection module 808 may grant the UE 115 access to a corresponding resource pool of the relay by indicating an admission threshold (e.g., priority threshold) for the resource pool. The UE 115 may select a relay through which to communicate with the BS 800 through by transmitting a data and/or communication signal using a resource of the resource pool corresponding to the selected relay.

As shown, the transceiver 810 may include the modem subsystem 812 and the RF unit 814. The transceiver 810 can be configured to communicate bi-directionally with other devices, such as the wireless communication devices 900 (which may be UEs 115) and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (data signals, configuration signals, etc.) from the modem subsystem 812 (on outbound transmissions). The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., channel state reports, data signals, etc.) to the relay selection module 808 for processing. The antennas 816 may include multiple antennas of similar or different designs in order to sustain multiple transmission links.

In an example, the transceiver 810 is configured transmit, to one or more wireless communication devices, a reference signal configuration indicating one or more reference signal resources (e.g., time-frequency resources). The transceiver 810 is further configured to receive, from a first wireless communication device of the one or more wireless communication devices, a channel state report based on one or more reference signals in the one or more reference signal resources, where the channel state report includes channel measurement information for one or more links, each link connecting a wireless communication device of the one or more wireless communication devices to a UE 115. The transceiver is further configured to transmit, to the UE 115 via a second wireless communication device 900 of the one or more wireless communication devices 900 based on the channel state report, a data signal.

Figure 9:
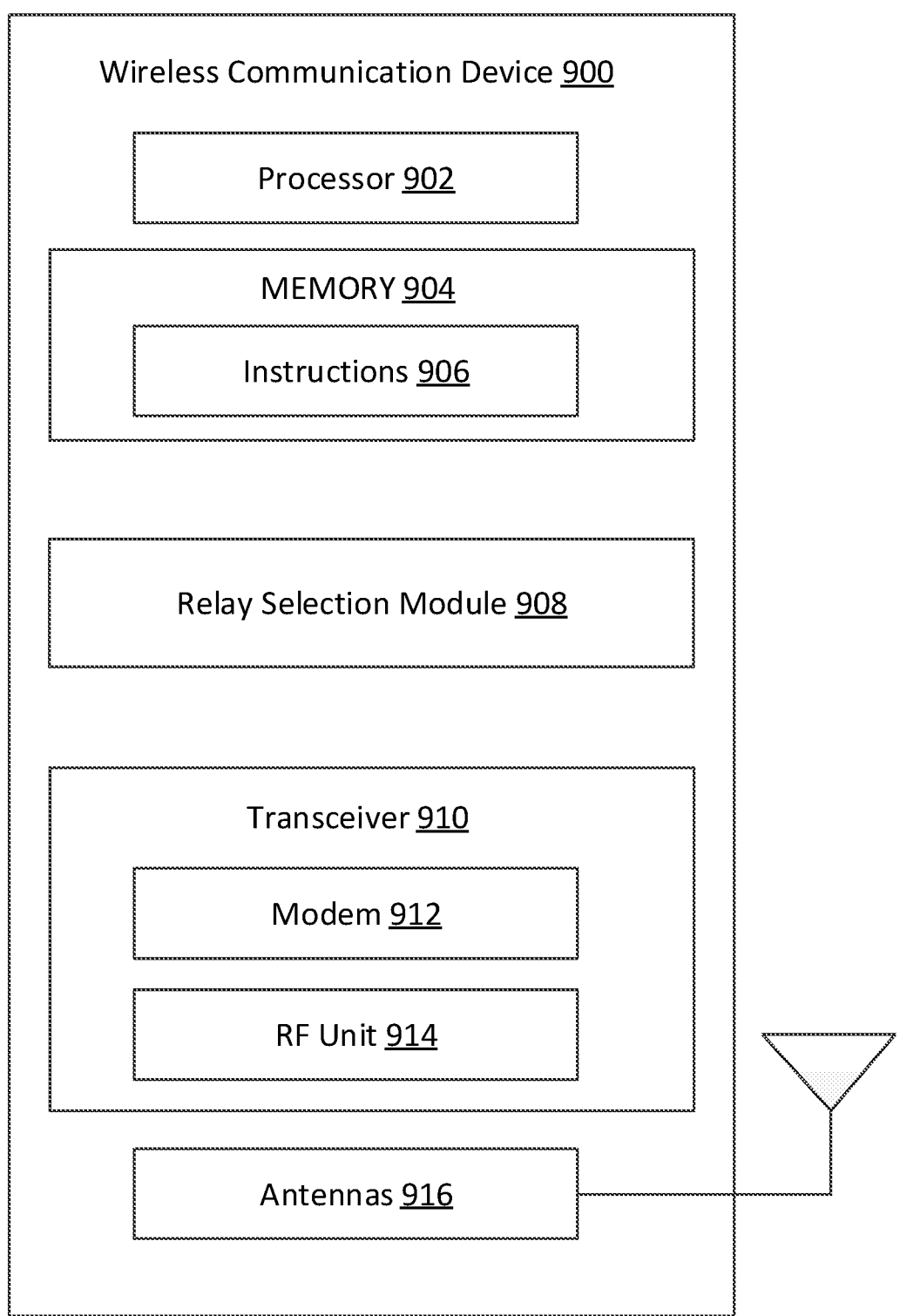
FIG. 9 illustrates a block diagram of a wireless communication device according to some aspects of the present disclosure.

FIG. 9 is a block diagram of an exemplary wireless communication device 900 according to some aspects of the present disclosure. The wireless communication device 900 may be, for example, a UE 115. In some instances, the wireless communication device 900 may be configured as a relay (e.g., a UE 115 configured as a relay). As shown, the wireless communication device 900 may include a processor 902, a memory 904, a relay selection module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 or an anchor in connection with aspects of the present disclosure, for example, aspects of FIGS. 1-11 and 13-14. Instructions 906 may also be referred to as code, which may be interpreted broadly to include any type of computer-readable statement(s) as discussed above with respect to FIG. 8.

The relay selection module 908 may be implemented via hardware, software, or combinations thereof. For example, the relay selection module 908 may be implemented as a processor, circuit, and/or instructions 906 stored in the memory 904 and executed by the processor 902. In some aspects, the relay selection module 908 can be integrated within the modem subsystem 912. For example, the relay selection module 908 can be implemented by a combination of software components (e.g., executed by a DSP or a general processor) and hardware components (e.g., logic gates and circuitry) within the modem subsystem 912. The relay selection module 908 may communicate with one or more components of wireless communication device 900 to implement various aspects of the present disclosure, for example, aspects of FIGS. 1-11 and 13-14.

For instance, the wireless communication device 900 may be a UE 115. For clarity, the wireless communication device 900 will be referred to as a UE 115 to distinguish it from other wireless communication devices 900 configured to operate as relays. The relay selection module 908 may receive, from a first wireless communication device 900 (e.g., a first relay) of one or more wireless communication devices 900, a reference signal configuration indicating one or more reference signal resources (e.g., time-frequency resources). Each wireless communication device 900 of the one or more wireless communication devices 900 may be configured to operate as a relay. For example, the wireless communication devices 900 may include UEs (similar to UE 115) configured to act as relays. For simplicity, the wireless communication devices 900 configured to act as relays may be referred to simply as relays herein. The UE 115 may be connected to as BS 800 via the first relay. The reference signal configuration may include scheduling information that may be used by the relays to transmit reference signals to the relay selection module 908, and by the relay selection module 908 to transmit reference signals to the relays. In some aspects, the relays included in the one or more wireless communication devices 900 may be based on the location of the UE 115. For example, only those relays within a certain distance of the UE 115 may transmit reference signals to the relay selection module 908. The location of UE 115 may be based on, for example, the beam(s) used to communicate with the UE 115.

The relay selection module 908 may further be configured to receive, from the one or more relays, one or more reference signals in the one or more reference signal resources, each of the one or more reference signals being received from a corresponding relay of the one or more relays. The one or more reference signals may include one or more CSI-RSs and/or one or more SSBs. For example, the relay selection module 908 may receive a reference signal (or multiple reference signals) from a relay on the reference signal resource(s) corresponding to the relay.

The relay selection module 908 may further be configured to transmit, to a BS 800 via the first relay, a first channel state report including channel measurement information for one or more links based on the one or more reference signals, each link connecting a wireless communication device of the one or more wireless communication devices to the UE 115. The channel state report may include channel measurement information for fewer links than the number of relays in the one or more relays. For example, the relay selection module 908 may perform channel measurements based on the received reference signals. Based on the channel measurements, the relay selection module 908 may select the relay with the link that provides the best channel conditions and include the channel measurement information for that relay in the channel state report. In some aspects, the relay selection module 908 may include channel measurement information for multiple relays in the channel state report (e.g., when multiple relays are involved in a link between the BS 800 and the UE 115, and/or when multiple links through different relays would provide a reliable connection). The channel measurement information may include at least one of an RSRP, SINR, CRI, or SSB-idx for each link of the one or more links. The channel state report may also include a relay ID identifying the relay to which the channel measurement information (or specific values within the channel measurement information) corresponds, as illustrated in FIG. 6.

In some aspects, the relay selection module 908 may further receive, from the first relay, a second reference signal configuration indicating one or more additional reference signal resources, and transmit, to the one or more wireless communication devices, one or more additional reference signals in the one or more additional reference signal resources. The additional reference signal resources may be used for transmitting UL reference signals (e.g., the additional reference signal resources) from the relay selection module 908 to the relays. For example, one or more reference signal resources may correspond to each relay. The additional reference signals may include one or more SRSs.

The relay selection module 908 may be further configured to receive, from the BS 800 via a second relay of the one or more relays, a data signal based on the first channel state report. For example, the second relay be the relay (or among the relays) included by the relay selection module 908 in the channel state report. Communication between the BS 800 and the UE 115 may be transitioned to the second relay, away from the first relay. In some aspects, the first and second relay may be different relays (e.g., the channel condition of a link through the second relay may be better as determined from the channel measurement information, so the BS 800 and UE 115 will transition to the second relay).

In some instances, the first and second relays may be the same relay. For example, communications may not transition from the first relay to a different relay if the first relay provides the best channel conditions, or if the link going through the second relay is unavailable.

In some aspects, the UE 115 may determine which relay to transition communication between itself and the BS 800 over to rather than the BS 800. For instance, data to be transmitted by the UE 115 may have time-stringent requirements (e.g., a survival time requirement) the BS 800 is unaware of, in which case the UE 115 may be in a better position to select a new relay.

For example, the relay selection module 908 of the UE 115 may receive, from the BS 800 via one or more relays, a channel state report including channel measurement information associated with the one or more relays. As above, the measurement information in the channel state report may include channel conditions for links through relays that may be available to the UE 115 for communicating with the BS 800.

The relay selection module 908 may further be configured to receive, from the BS 800 via a first relay of the one or more relays (e.g., the relay currently connecting the UE 115 and the BS 800), an indication of one or more uplink resources associated with the one or more relays.

The relay selection module 908 may further be configured to transmit, to the BS 800 via a second relay of the one or more relays using an uplink resource of the one or more uplink resources, a first data signal, where the second relay is based on the channel state report. The relay selection module 908 may select the second relay through which to communicate with the BS 800 based on the channel state report (e.g., the relay selection module 908 may select the relay associated with the best channel condition).

In some aspects, each uplink resource indicated by the BS 800 may correspond to a specific relay. For example, there may be the same number of uplink resources indicated as the number of relays. The relay selection module 908 can use the uplink resource corresponding to a relay to communicate with or through the relay. In some aspects, transmitting the communication signal includes transmitting the communication signal in the uplink resource corresponding to the second relay. For example, a relay may monitor its corresponding uplink resource to detect a transmission from the relay selection module 908, and the relay selection module 908 may identify a relay as being the second relay by transmitting the communication signal using the corresponding uplink resource. The BS 800 may indicate to each relay a UE ID (e.g., a C-RNTI) associated with its corresponding uplink resource, which the relay may use to identify the UE 115 selecting the relay. In some aspects, the relay selection module 908 may transmit, to the second relay, a communication signal including an indication of the UE ID (e.g., instead of or in addition to having the BS 800 indicate the UE ID).

In some aspects, each relay of the one or more relays may be associated with a resource pool (including a set of time-frequency resources occupying one or more symbols in time and one or more subcarriers in frequency), and the transmitting the communication signal may include transmitting the communication signal using a resource within a first resource pool associated with the second relay. For example, the BS 800 may schedule different resource pools for each relay (e.g., one resource pool for each relay). The relay selection module 908 may use resources within the resource pool to transmit data to or through the relay. Each resource pool may include an access control. For example, a relay or the BS 800 may grant the UE 115 access to a corresponding resource pool of the relay by indicating an admission threshold (e.g., priority threshold) for the resource pool. The relay selection module 908 may compare the priority (traffic priority) of the first data signal to the admission threshold of the resource pool and may transmit the first data signal using a resource from the resource pool if the priority associated with the first data signal is equal or greater than the admission threshold. In some aspects, transmitting the communication signal in the resource within the first resource pool is based on a random number generated by the relay selection module 908 satisfying a threshold. For example, the relay selection module 908 may generate a random number and may then compare the random number to the threshold. The relay selection module 908 may transmit the first data signal using a resource from the resource pool if the random number is greater than the threshold.

The wireless communication device 900 may also act as a relay. For example, the wireless communication device 900 may be a UE 115 configured to act as a relay between a BS 800 and a different UE 115. For clarity, the wireless communication device 900 configured to act as a relay will be referred to simply as a relay herein, and the UE 115 communicating through the relay will be referred to as a UE 115.

The relay selection module 908 of the relay may receive, from the BS 800, a reference signal configuration indicating one or more reference signal resources (e.g., time-frequency resources). The reference signal configuration may include scheduling information that may be used by the relay to transmit reference signals (e.g., CSI-RSs and SSBs) to a UE 115, and by the UE 115 to transmit reference signals (e.g., SRSs) to the relay. The relay selection module 908 may transmit an additional reference signal configuration to the UE 115 (e.g., based on the reference signal configuration received by the relay from the BS 800) indicating one or more additional reference signal resources for use by the UE 115 in transmitting reference signals to the relay.

The relay selection module 908 may further be configured to receive, from the BS 800, a reference signal configuration indicating one or more reference signal resources (e.g., time-frequency resources). The reference signal configuration may include scheduling information that may be used by the relay to transmit reference signals (e.g., CSI-RSs and SSBs) to a UE 115, and by the UE 115 to transmit reference signals (e.g., SRSs) to the relay. The relay selection module 908 may transmit an additional reference signal configuration to the UE 115 (e.g., based on the reference signal configuration received by the relay from the BS 800) indicating one or more additional reference signal resources for use by the UE 115 in transmitting reference signals to the relay.

The relay selection module 908 may further be configured to transmit, to the UE 115, a first reference signal in a first reference signal resource of the one or more reference signal resources. The first reference signal may be a CSI-RS. The relay selection module 908 may also transmit an SSB with predetermined signal waveforms known to the UE 115 (e.g., the first reference signal may be an SSB).

The relay selection module 908 may further be configured to receive, from the UE 115, a first channel state report including channel measurement information for a link between the wireless communication device and the UE 115 based on the first reference signal. For example, the measurement information may be based on a CSI-RS and/or an SSB transmitted by the relay selection module 908 as the first reference signal and may reflect the DL channel condition of the link between the relay and the UE 115. In some aspects, the channel measurement information may include at least one of an RSRP, an SINR (e.g., an L1-SINR), a CRI, or an SSB-idx. The RSRP and SINR may be used to indicate the channel quality, and the CRI and SSB-idx may be used to indicate a transmission beam for communicating with the UE 115.

The relay selection module 908 may further be configured to receive, from the UE 115, a second reference signal in a second reference signal resource of the one or more reference signal resources. The second reference signal may be, for example, an SRS.

The relay selection module 908 may further be configured to transmit, to the BS 800, a second channel state report based on the second reference signal (e.g., the SRS signal). For example, the relay selection module 908 may perform channel measurement using the SRS and include results based on the measurements in the second channel state report. In some aspects, the relay selection module 908 may also transmit, to the BS, a communication signal including the first channel state report (e.g., via PUSCH). For example, the relay selection module 908 may forward the first channel state report from the UE 115 to the BS 800 (possibly including additional headers or information from the relay). In some aspects, the relay may receive (e.g., via the transceiver 910), from the BS 800, a data signal based on at least one of the first channel state report or the second channel state report and forward the data signal to the UE 115.

In some aspects, the relay selection module 908 may be further configured to grant access to a resource pool associated with the relay to the UE 115. For example, the BS 800 may have scheduled the resource pool for the relay. The relay selection module 908 may grant the UE 115 access to a corresponding resource pool of the relay by indicating an admission threshold (e.g., priority threshold) for the resource pool. The relay may receive the data signal from the UE 115 in a resource of the resource pool (e.g., if the UE 115 determines the admission threshold is satisfied).

As shown, the transceiver 910 may include the modem subsystem 912 and the RF unit 914. The transceiver 910 can be configured to communicate bi-directionally with other devices, such as the BSs 105 and 800. The modem subsystem 912 may be configured to modulate and/or encode the data from the memory 904 and/or the relay selection module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., data signals, communication signals, reference signals, channel state reports, etc.) from the modem subsystem 912 (on outbound transmissions). The RF unit 914 may be further configured to perform analog beamforming in conjunction with the digital beamforming. Although shown as integrated together in transceiver 910, the modem subsystem 912 and the RF unit 914 may be separate devices that are coupled together at the wireless communication device 900 to enable the wireless communication device 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., data signals, communication signals, reference signals, channel state reports, etc.) to the relay selection module 908 for processing. The antennas 916 may include multiple antennas of similar or different designs in order to sustain multiple transmission links.

In an example, the transceiver 910 is configured to receive, from a first wireless communication device 900 of one or more wireless communication devices, a reference signal configuration indicating one or more reference signal resources. The transceiver 910 is further configured to receive, from the one or more wireless communication devices 900, one or more reference signals in the one or more reference signal resources, each of the one or more reference signals being received from a corresponding wireless communication device 900 of the one or more wireless communication devices 900. The transceiver 910 is further configured to transmit, to a BS 800 via the first wireless communication device 900, a first channel state report including channel measurement information for one or more links based on the one or more reference signals, each link connecting a wireless communication device of the one or more wireless communication devices to the UE 115. The transceiver 910 is further configured to receive, from the BS 800 via a second wireless communication device 900 of the one or more wireless communication devices 900, a data signal based on the first channel state report.

In another example, the transceiver 910 is configured to receive, from a BS 800 via one or more wireless communication devices, a channel state report including channel measurement information associated with the one or more wireless communication devices. The transceiver is further configured to receive, from the BS 800 via a first wireless communication device of the one or more wireless communication devices, an indication of one or more uplink resources associated with the one or more wireless communication devices. The transceiver is further configured to transmit, to the BS via a second wireless communication device of the one or more wireless communication devices using an uplink resource of the one or more uplink resources, a first data signal, wherein the second wireless communication device is based on the channel state report.

In an another example, the transceiver 910 is configured to receive, from a BS 800, a reference signal configuration indicating one or more reference signal resources. The transceiver is further configured to transmit, to a UE 115, a first reference signal in a first reference signal resource of the one or more reference signal resources. The transceiver is further configured to receive, from the UE 115, a first channel state report including channel measurement information for a link between the wireless communication device and the UE based on the first reference signal. The transceiver is further configured to receive, from the UE, a second reference signal in a second reference signal resource of the one or more reference signal resources. The transceiver is further configured to transmit, to the BS, a second channel state report based on the second reference signal.

FIG. 10 is a flow diagram illustrating a communication method 1000 according to some aspects of the present disclosure. Aspects of the method 1000 can be executed by a computing device (e.g., a processor, processing circuit, and/or other suitable component) of a wireless communication device or other suitable means for performing the blocks. For example, the wireless communication device may be a BS 800. The BS 800 may utilize one or more components, such as the processor 802, the memory 804, the relay selection module 808, the transceiver 810, the modem 812, the RF unit 814, and the one or more antennas 816, to execute the blocks of method 1000. The method 1100 may employ similar mechanisms as described in FIGS. 2-9 and 11-13. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1002, the BS transmits, to one or more wireless communication devices 900, a reference signal configuration indicating one or more reference signal resources (e.g., time-frequency resources). Each wireless communication device 900 may be configured to operate as a relay. For example, the wireless communication devices 900 may include UEs (similar to UE 115) configured to act as relays. The reference signal configuration may include scheduling information that may be used by the relays to transmit reference signals to a UE 115 (which may also be a wireless communication device 900), and by the UE 115 to transmit reference signals to the relays. The BS 800 may already be in communication with the UE 115 (either directly, or through one of the relays). In some aspects, the relays included in the one or more wireless communication devices 900 may be based on the location of the UE 115 connected to the BS 800. For example, the BS 800 may schedule only those relays within a certain distance of the UE 115 to transmit reference signals to the UE (and similarly, the BS 800 may schedule the UE 115 to transmit reference signals only to those same relays). The BS 800 may determine the location of the UE 115 based on, for example, the beam(s) used to communicate with the UE 115. In some aspects, the BS 800 may schedule all of the relays that are among the one or more wireless communication devices 900 to transmit reference signals to the UE 115 and/or schedule the UE 115 to transmit reference signals to each of those relays. In some aspects, the means for performing the operations of block 1002 can, but do not necessarily, include the processor 802, the memory 804, the relay selection module 808, the transceiver 810, the modem 812, the RF unit 814, and the one or more antennas 816 with reference to FIG. 8.

At block 1004, the BS 800 receives, from a first wireless communication device of the one or more wireless communication devices (e.g., via a relay on the link between the UE 115 and the BS 800), a channel state report based on one or more reference signals in the one or more reference signal resources. The channel state report includes channel measurement information for one or more links, each link connecting a wireless communication device of the one or more wireless communication devices to the UE 115. For example, the relays may have transmitted reference signals to the UE 115 in the reference signal resources indicated for that relay in the reference signal configuration. The references signals may include CSI-RSs and/or SSBs. The measurement information included in the channel state report may be based on measurements performed by the UE 115 (e.g., based on the CSI-RSs and SSBs), reflecting the DL channel condition of the link between a relay and the UE 115.

In some aspects, additional channel state reports may be received by the BS 105 from one or more of the wireless communication devices 900 (e.g., relays), reflecting the uplink conditions of the link between a relay and the UE 115. For example, the UE 115 may transmit an SRS to each relay in reference signal resources indicated in the reference signal configuration. Each relay may perform measurements based on the SRS(s) transmitted to it, and transmit a channel state report including measurement information to the BS 800 (e.g., via PUSCH).

In some aspects, the channel measurement information may include at least one of an RSRP, a SINR (e.g., an L1-SINR), a CRI, or an SSB-idx for each link of the one or more links. The RSRP and SINR may be used to indicate the channel quality, and the CRI and SSB may be used to indicate a transmission beam for communicating with the UE 115. As illustrated in FIG. 6, the channel state report may also include one or more relay IDs identifying the relays to which the channel measurement information (or particular values within the channel measurement information) corresponds.

In some aspects, a channel state report may include information for fewer links than a number of wireless communication devices in the one or more wireless communication devices. For example, the UE 115 may include information (e.g., RSRP, SINR, CRI, and/or SSB-idx) for a link to a single relay (e.g., the link with the best channel conditions). The channel state report may also include information for multiple links. In some aspects, the means for performing the operations of block 1004 can, but do not necessarily, include the processor 802, the memory 804, the relay selection module 808, the transceiver 810, the modem 812, the RF unit 814, and the one or more antennas 816 with reference to FIG. 8

At block 1006, the BS 800 transmits, to the UE via a second wireless communication device of the one or more wireless communication devices based on the channel state report, a data signal (e.g., a PUSCH signal carrying data and/or a PUCCH signal carrying uplink control information (UCI)). For example, the BS 800 may select a second relay from the one or more relays to use for communicating with the UE 115, based on the channel state report(s). The channel state report may include measurement information associated with a different relay than the first relay (the one currently used by the BS 800 to communicate with the UE 115). The BS 800 may transition communications to the second relay, away from the first relay. In some aspects, where the channel state report includes information for more than one relay, the BS 800 may select the second relay from those for which information is included in the report. In some aspects, the first and second relays may be the same (e.g., BS 800 may keep using the first relay rather than transitioning to the second relay). For example, the link through the current relay may provide the best channel condition (as determined based on the channel state report), or the link through the second relay may be unavailable. In some aspects, the BS 800 may also randomly select a relay to transmit the data signal on (e.g., when a link through the second relay is unavailable), or transmit data directly to the UE 115.

In some aspects, the BS 800 may switch between the first relay and the second relay, for example, as channel condition varies. As an example, at a certain period of time, the second relay may provide a better channel quality (e.g., a higher RSRP, SNR, and/or SINR) than the first relay, and thus the BS 800 may select the second relay for communication with UE 115. At a later time period, the first relay may provide a better channel quality (e.g., a higher RSRP, SNR, and/or SINR) than the second relay, and thus the BS 800 may switch back to the first relay for communication with UE 115. Accordingly, the BS 800 may select a most suitable link for communication with the UE 115 at any given time adapting to channel conditions.

In some aspects, the BS 800 may switch between the first and second relays for UL and DL communications. As an example, the BS 800 may utilize the first relay for DL communication with the UE 115 based on the first relay providing the a better channel quality than the second relay (indicated by DL channel measurements from the UE 115, the first relay, and/or the second relay), and may utilize the second relay for UL communication with the UE 115 based on the second relay providing the a better channel quality than the first relay (indicated by UL channel measurements from the BS 800, the first relay and/or the second relay), or vice versa.

In some aspects, the means for performing the operations of block 1006 can, but do not necessarily, include the processor 802, the memory 804, the relay selection module 808, the transceiver 810, the modem 812, the RF unit 814, and the one or more antennas 816 with reference to FIG. 8.

FIG. 11 is a flow diagram illustrating a communication method 1100 according to some aspects of the present disclosure. Aspects of the method 1100 can be executed by a computing device (e.g., a processor, processing circuit, and/or other suitable component) of a wireless communication device 900 or other suitable means for performing the blocks. For example, the wireless communication device 900 may be a device configured to act as a relay (e.g., a UE 115). The wireless communication device 900 (referred to as a relay herein for simplicity) may utilize one or more components, such as the processor 902, the memory 904, the relay selection module 908, the transceiver 910, the modem 912, the RF unit 914, and the one or more antennas 916, to execute the blocks of method 1100. The method 1100 may employ similar mechanisms as described in FIGS. 2-10 and 12-13. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1102, the relay receives, from a BS 800, a reference signal configuration indicating one or more reference signal resources (e.g., time-frequency resources). The reference signal configuration may include scheduling information that may be used by the relay to transmit reference signals (e.g., CSI-RSs and SSBs) to a UE 115, and by the UE 115 to transmit reference signals (e.g., SRSs) to the relay. The relay may transmit an additional reference signal configuration to the UE 115 (e.g., based on the reference signal configuration received by the relay from the BS 800) indicating one or more additional reference signal resources for use by the UE 115 in transmitting reference signals to the relay. In some aspects, the means for performing the operations of block 1102 can, but do not necessarily, include the processor 902, the memory 904, the relay selection module 908, the transceiver 910, the modem 912, the RF unit 914, and the one or more antennas 916 with reference to FIG. 9.

At block 1104, the relay transmits, to a UE, a first reference signal in a first reference signal resource of the one or more reference signal resources. The first reference signal may be a CSI-RS. The relay may also transmit an SSB with predetermined signal waveforms known to the UE 115 (e.g., the first reference signal may be an SSB). In some aspects, the means for performing the operations of block 1104 can, but do not necessarily, include the processor 902, the memory 904, the relay selection module 908, the transceiver 910, the modem 912, the RF unit 914, and the one or more antennas 916 with reference to FIG. 9.

At block 1106, the relay receives, from the UE 115, a first channel state report including channel measurement information for a link between the wireless communication device and the UE based on the first reference signal. For example, the measurement information may be based on a CSI-RS and/or an SSB transmitted by the relay as the first reference signal and may reflect the DL channel condition of the link between the relay and the UE 115. In some aspects, the channel measurement information may include at least one of an RSRP, a SINR (e.g., an L1-SINR), a CRI, or an SSB-idx. The RSRP and SINR may be used to indicate the channel quality, and the CRI and SSB-idx may be used to indicate a transmission beam for communicating with the UE 115. In some aspects, the means for performing the operations of block 1106 can, but do not necessarily, include the processor 902, the memory 904, the relay selection module 908, the transceiver 910, the modem 912, the RF unit 914, and the one or more antennas 916 with reference to FIG. 9.

At block 1108, the relay receives, from the UE, a second reference signal in a second reference signal resource of the one or more reference signal resources. The second reference signal may be, for example, a sounding reference signal (SRS). In some aspects, the means for performing the operations of block 1108 can, but do not necessarily, include the processor 902, the memory 904, the relay selection module 908, the transceiver 910, the modem 912, the RF unit 914, and the one or more antennas 916 with reference to FIG. 9.

At block 1110, the relay transmits, to the BS, a second channel state report based on the second reference signal (e.g., the SRS signal). For example, the relay may perform channel measurement using the SRS and include results based on the measurements in the second channel state report. In some aspects, the relay may also transmit, to the BS, a communication signal including the first channel state report (e.g., via PUSCH). For example, the relay may forward the first channel state report from the UE 115 to the BS 800 (possibly including additional headers or information from the relay). In some aspects, the relay may receive, from the BS, a data signal based on at least one of the first channel state report or the second channel state report and transmit the data signal to the UE 115. For example, the relay may have been selected by the BS 800 and/or the UE 115 to relay communications between the BS 800 and the UE 115. In some aspects, the means for performing the operations of block 1110 can, but do not necessarily, include the processor 902, the memory 904, the relay selection module 908, the transceiver 910, the modem 912, the RF unit 914, and the one or more antennas 916 with reference to FIG. 9.

FIG. 12 is a flow diagram illustrating a communication method 1200 according to some aspects of the present disclosure. Aspects of the method 1200 can be executed by a computing device (e.g., a processor, processing circuit, and/or other suitable component) of a UE 115 or other suitable means for performing the blocks. For example, the UE 115 may be wireless communication device 900. The UE 115 may utilize one or more components, such as the processor 902, the memory 904, the relay selection module 908, the transceiver 910, the modem 912, the RF unit 914, and the one or more antennas 916, to execute the blocks of method 1200. The method 1200 may employ similar mechanisms as described in FIGS. 2-11 and 13. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1202, the UE 115 receives, from a first wireless communication device 900 (e.g., a first relay) of one or more wireless communication devices 900, a reference signal configuration indicating one or more reference signal resources (e.g., time-frequency resources). Each wireless communication device 900 may be configured to operate as a relay. For example, the wireless communication devices 900 may include UEs (similar to UE 115) configured to act as relays. For simplicity, the wireless communication devices 900 may be referred to as relays herein. The UE 115 may be connected to as BS 800 via the first relay. The reference signal configuration may include scheduling information that may be used by the relays to transmit reference signals to the UE 115, and by the UE 115 to transmit reference signals to the relays. In some aspects, the relays included in the one or more wireless communication devices 900 may be based on the location of the UE 115. For example, only those relays within a certain distance of the UE 115 may transmit reference signals to the UE. The location of the UE 115 may be determined based on, for example, the beam(s) used to communicate with the UE 115.

In some aspects, the means for performing the operations of block 1202 can, but do not necessarily, include the processor 902, the memory 904, the relay selection module 908, the transceiver 910, the modem 912, the RF unit 914, and the one or more antennas 916 with reference to FIG. 9.

At block 1204, the UE 115 receives, from the one or more relays, one or more reference signals in the one or more reference signal resources, each of the one or more reference signals being received from a corresponding relay of the one or more relays. The one or more reference signals may include one or more CSI-RSs and/or one or more SSBs. For example, the UE 115 may receive a reference signal (or multiple reference signals) from a relay on the reference signal resource(s) corresponding to the relay. In some aspects, the means for performing the operations of block 1204 can, but do not necessarily, include the processor 902, the memory 904, the relay selection module 908, the transceiver 910, the modem 912, the RF unit 914, and the one or more antennas 916 with reference to FIG. 9.

At block 1206, the UE 115 transmits, to a BS via the first relay, a first channel state report including channel measurement information for one or more links based on the one or more reference signals, each link connecting a wireless communication device of the one or more wireless communication devices to the UE 115. The channel state report may include channel measurement information for fewer links than the number of relays in the one or more relays. For example, the UE 115 may perform channel measurements based on the reference signals received at block 1204. Based on the channel measurements, the UE 115 may select the relay with the link that provides the best channel conditions and include the channel measurement information for that relay in the channel state report. In some aspects, the UE 115 may include channel measurement information for multiple relays in the channel state report (e.g., when multiple relays are involved in a link between the BS 800 and the UE 115, and/or when multiple links through different relays would provide a reliable connection). The channel measurement information may include at least one of an RSRP, SINR, CRI, or SSB-idx for each link of the one or more links. The channel state report may also include a relay ID identifying the relay to which the channel measurement information (or specific values within the channel measurement information) corresponds, as illustrated in FIG. 6.

In some aspects, the UE 115 may further receive, from the first relay, a second reference signal configuration indicating one or more additional reference signal resources, and transmit, to the one or more wireless communication devices, one or more additional reference signals in the one or more additional reference signal resources. The additional reference signal resources may be used for transmitting UL reference signals (e.g., the additional reference signal resources) from the UE 115 to the relays. For example, one or more reference signal resources may correspond to each relay. The additional reference signals include one or more SRSs. In some aspects, the means for performing the operations of block 1206 can, but do not necessarily, include the processor 902, the memory 904, the relay selection module 908, the transceiver 910, the modem 912, the RF unit 914, and the one or more antennas 916 with reference to FIG. 9.

At block 1208, the UE 115 receives, from the BS 800 via a second relay of the one or more relays, a data signal based on the first channel state report. For example, the second relay may be the relay (or among the relays) included by the UE 115 in the channel state report. Communication between the BS 800 and the UE 115 may be transitioned to the second relay, away from the first relay. In some aspects, the first and second relay will be different relays (e.g., the channel condition of a link through the second relay may be better as determined from the channel measurement information, so the BS 800 and UE 115 will transition to the second relay). In some instances, the first and second relays may be the same relay. For example, communications may not transition from the first relay to a different relay if the first relay provides the best channel conditions, or if the link going through the second relay is unavailable. In some aspects, the means for performing the operations of block 1208 can, but do not necessarily, include the processor 902, the memory 904, the relay selection module 908, the transceiver 910, the modem 912, the RF unit 914, and the one or more antennas 916 with reference to FIG. 9.

FIG. 13 is a flow diagram illustrating a communication method 1300 according to some aspects of the present disclosure. Aspects of the method 1300 can be executed by a computing device (e.g., a processor, processing circuit, and/or other suitable component) of a UE 115 or other suitable means for performing the blocks. For example, the UE 115 may be wireless communication device 900. The UE 115 may utilize one or more components, such as the processor 902, the memory 904, the relay selection module 908, the transceiver 910, the modem 912, the RF unit 914, and the one or more antennas 916, to execute the blocks of method 1300. The method 1300 may employ similar mechanisms as described in FIGS. 2-12. As illustrated, the method 1300 includes a number of enumerated blocks, but aspects of the method 1300 may include additional blocks before, after, and in between the enumerated blocks. In some aspects, one or more of the enumerated blocks may be omitted or performed in a different order.

At block 1302, the UE 115 receives, from a BS 800 via one or more wireless communication devices, a channel state report including channel measurement information associated with the one or more wireless communication devices. Each wireless communication device 900 may be configured to operate as a relay. For example, the wireless communication devices 900 may include UEs (similar to UE 115) configured to act as relays. For simplicity, the wireless communication devices 900 may be referred to as relays herein. The measurement information in the channel state report may include channel conditions for links through relays that may be available to the UE 115 for communicating with the BS 105 (e.g., relays in range of the UE 115 and the BS 105). In some aspects, the means for performing the operations of block 1302 can, but do not necessarily, include the processor 902, the memory 904, the relay selection module 908, the transceiver 910, the modem 912, the RF unit 914, and the one or more antennas 916 with reference to FIG. 9.

At block 1304, the UE 115 receives, from the BS via a first relay of the one or more relays, an indication of one or more uplink resources associated with the one or more relays. In some aspects, the means for performing the operations of block 1304 can, but do not necessarily, include the processor 902, the memory 904, the relay selection module 908, the transceiver 910, the modem 912, the RF unit 914, and the one or more antennas 916 with reference to FIG. 9.

At block 1306, the UE 115 transmits, to the BS 800 via a second relay of the one or more relays using an uplink resource of the one or more uplink resources, a first data signal, wherein the second relay is based on the channel state report. The UE 115 may select the second relay through which to communicate with the BS 800 based on the channel state report (e.g., the UE 115 may select the relay associated with the best channel condition).

In some aspects, each uplink resource indicated by the BS 800 may correspond to a specific relay. For example, there may be the same number of uplink resources indicated as the number of relays. The UE 115 can use the uplink resource corresponding to a relay to communicate with or through the relay. In some aspects, transmitting the communication signal includes transmitting the communication signal in the uplink resource corresponding to the second relay. For example, a relay may monitor its corresponding uplink resource to detect a transmission from the UE 115, and the UE 115 may identify a relay as being the second relay by transmitting the communication signal using the corresponding uplink resource. The BS 800 may indicate to each relay a UE ID (e.g., a C-RNTI) associated with its corresponding uplink resource, which the relay may use to identify the UE 115 selecting the relay. In some aspects, the UE 115 may transmit, to the second relay, a communication signal including an indication of the UE ID (e.g., instead of or in addition to having the BS 800 indicate the UE ID).

In some aspects, each relay of the one or more relays may be associated with a resource pool (including a set of time-frequency resources occupying one or more symbols in time and one or more subcarriers in frequency), and the transmitting the communication signal may include transmitting the communication signal using a resource within a first resource pool associated with the second relay. For example, the BS 800 may schedule different resource pools for each relay (e.g., one resource pool for each relay). The UE 115 may use resources within the resource pool to transmit data to or through the relay. Each resource pool may include an access control. For example, the access control may be an admission threshold based on a priority or a random number. In some aspects, transmitting the communication signal using the resource within the first resource pool is further based on a priority associated with the first data signal satisfying the threshold. For example, the relay or BS 800 may grant the UE 115 access to the first resource pool by indicating an admission threshold (e.g., priority threshold) for the resource pool. The UE 115 may compare the priority (traffic priority) of the first data signal to the admission threshold of the resource pool and may transmit the first data signal using a resource from the resource pool if the priority associated with the first data signal is equal or greater than the admission threshold. In some aspects, transmitting the communication signal in the resource within the first resource pool is based on a random number generated by the UE 115 satisfying a threshold. For example, the UE 115 may generate a random number and may then compare the random number to the threshold. The UE 115 may transmit the first data signal using a resource from the first resource pool if the random number is greater than the threshold.

In some aspects, the means for performing the operations of block 1306 can, but do not necessarily, include the processor 902, the memory 904, the relay selection module 908, the transceiver 910, the modem 912, the RF unit 914, and the one or more antennas 916 with reference to FIG. 9.

Further aspects of the present disclosure include the following:

1. A method of wireless communication performed by a base station (BS), the method comprising:

transmitting, to one or more wireless communication devices, a reference signal configuration indicating one or more reference signal resources;

receiving, from a first wireless communication device of the one or more wireless communication devices, a channel state report based on one or more reference signals in the one or more reference signal resources, wherein the channel state report includes channel measurement information for one or more links, each link connecting a wireless communication device of the one or more wireless communication devices to a user equipment (UE); and transmitting, to the UE via a second wireless communication device of the one or more wireless communication devices based on the channel state report, a data signal.

2. The method of clause 1, further comprising:

selecting, based on a location of the UE, the one or more wireless communication devices.

3. The method of any of clauses 1-2, wherein each wireless communication device of the one or more wireless communication devices is a UE.

4. The method of any of clauses 1-3, wherein the one or more reference signals include at least one of a channel state information reference signal (CSI-RS), a sounding reference signal (SRS), or a synchronization signal block (SSB).

5. The method of any of clauses 1-4, wherein the channel measurement information includes at least one of a reference signal receive power (RSRP), a signal-to-interference-plus-noise ratio (SINR), a CSI-RS resource indicator (CRI), or a synchronization signal block (SSB) index for each link of the one or more links.

6. The method of any of clauses 1-5, wherein the channel state report includes channel measurement information for fewer links than a number of wireless communication devices in the one or more wireless communication devices.

7. The method of any of clauses 1-6, wherein the first wireless communication device and the second wireless communication device are different wireless communication devices.

8. The method of any of clauses 1-6, wherein the first wireless communication device and the second wireless communication device are the same wireless communication device.

9. A method of wireless communication performed by a wireless communication device, the method comprising:

receiving, from a base station (BS), a reference signal configuration indicating one or more reference signal resources;

transmitting, to a user equipment (UE), a first reference signal in a first reference signal resource of the one or more reference signal resources;

receiving, from the UE, a first channel state report including channel measurement information for a link between the wireless communication device and the UE based on the first reference signal;

receiving, from the UE, a second reference signal in a second reference signal resource of the one or more reference signal resources; and transmitting, to the BS, a second channel state report based on the second reference signal.

10. The method of clause 9, wherein the first reference signal is a channel state information reference signal (CSI-RS).

11. The method of any of clauses 9-10, wherein the second reference signal is a sounding reference signal (SRS).

12. The method of any of clauses 9-11, wherein the channel measurement information includes at least one of a reference signal receive power (RSRP), signal-to-interference-plus-noise ratio (SINR), CSI-RS resource indicator (CRI), or a synchronization signal block (SSB) index.

13. The method of any of clauses 9-12, further comprising:

transmitting, to the BS, a communication signal including the first channel state report.

14. The method of any of clauses 9-13, wherein the transmitting the first channel state report includes transmitting the first channel state report via a physical uplink shared channel (PUSCH).

15. The method of clause any of clauses 9-14, further comprising:

receiving, from the BS, a data signal based on at least one of the first channel state report or the second channel state report;

transmitting, to the UE, the data signal.

16. A method of wireless communication performed by a user equipment (UE), the method comprising:

receiving, from a first wireless communication device of one or more wireless communication devices, a reference signal configuration indicating one or more reference signal resources;

receiving, from the one or more wireless communication devices, one or more reference signals in the one or more reference signal resources, each of the one or more reference signals being received from a corresponding wireless communication device of the one or more wireless communication devices;

transmitting, to a base station (BS) via the first wireless communication device, a first channel state report including channel measurement information for one or more links based on the one or more reference signals, each link connecting a wireless communication device of the one or more wireless communication devices to the UE; and receiving, from the BS via a second wireless communication device of the one or more wireless communication devices, a data signal based on the first channel state report.

17. The method of clause 16, wherein the one or more reference signals includes one or more channel state information reference signals (CSI-RSs).

18. The method of clause any of clauses 16-17, further comprising:

receiving, from the first wireless communication device, a second reference signal configuration indicating one or more additional reference signal resources;

transmitting, to the one or more wireless communication devices, one or more additional reference signals in the one or more additional reference signal resources.

19. The method of any of clauses 16-18, wherein the one or more additional reference signals include one or more sounding reference signals (SRSs).

20. The method of any of clauses 16-19, wherein the first wireless communication device and the second wireless communication device are different wireless communication devices.

21. The method of any of clauses 16-19, wherein the first wireless communication device and the second wireless communication device are the same wireless communication device.

22. The method of any of clauses 16-19, wherein the channel measurement information includes at least one of a reference signal receive power (RSRP), signal-to-interference-plus-noise ratio (SINR), CSI-RS resource indicator (CRI), or a synchronization signal block (SSB) index for each link of the one or more links.

23. The method of any of clauses 16-19, wherein the first channel state report includes channel measurement information for fewer links than a number of wireless communication devices in the one or more wireless communication devices.

24. A method of wireless communication performed by a user equipment (UE), the method comprising:

receiving, from a base station (BS) via one or more wireless communication devices, a channel state report including channel measurement information associated with the one or more wireless communication devices;

receiving, from the BS via a first wireless communication device of the one or more wireless communication devices, an indication of one or more uplink resources associated with the one or more wireless communication devices; and transmitting, to the BS via a second wireless communication device of the one or more wireless communication devices using an uplink resource of the one or more uplink resources, a first data signal, wherein the second wireless communication device is based on the channel state report.

25. The method of clause 24, further comprising:

transmitting, to the second wireless communication device, a communication signal including an indication of a UE identifier (ID) identifying the UE.

26. The method of clause 25, wherein the transmitting the communication signal includes transmitting the communication signal in the uplink resource corresponding to the second wireless communication device.

27. The method of clause 25, wherein each wireless communication device of the one or more wireless communication devices is associated with a resource pool, and the transmitting the communication signal includes:

transmitting the communication signal using a resource within a first resource pool associated with the second wireless communication device.

28. The method of clause 27, wherein the transmitting the communication signal using the resource within the first resource pool is further based on a priority associated with the first data signal satisfying a threshold.

29. The method of clause 27, wherein the transmitting the communication signal in the resource within the first resource pool is further based on a random number generated by the UE satisfying a threshold.

30. The method of any of clauses 24-29, wherein the UE ID is a cell radio network temporary identifier (C-RNTI).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a base station (BS), the method comprising:

transmitting, to one or more wireless communication devices configured to operate as one or more relays, a reference signal configuration indicating one or more reference signal resources associated with one or more reference signals generated by the one or more wireless communication devices, wherein the one or more reference signals are different from the reference signal configuration;

receiving, from a first wireless communication device of the one or more wireless communication devices and in accordance with the reference signal configuration, a channel state report based on the one or more reference signals in the one or more reference signal resources, wherein the channel state report includes channel measurement information for one or more links, each link connecting a wireless communication device of the one or more wireless communication devices to a user equipment (UE); and transmitting, to the UE via a second wireless communication device of the one or more wireless communication devices based on the channel state report, a data signal.

2. The method of claim 1, further comprising:

selecting, based on a location of the UE, the one or more wireless communication devices.

3. The method of claim 1, wherein each wireless communication device of the one or more wireless communication devices is a UE.

4. The method of claim 1, wherein the one or more reference signals include at least one of a channel state information reference signal (CSI-RS) or a synchronization signal block (SSB).

5. The method of claim 1, wherein the channel measurement information includes at least one of a reference signal receive power (RSRP), a signal-to-interference-plus-noise ratio (SINR), a CSI-RS resource indicator (CRI), or a synchronization signal block (SSB) index for each link of the one or more links.

6. The method of claim 1, wherein the channel state report includes channel measurement information for fewer links than a number of wireless communication devices in the one or more wireless communication devices.

7. The method of claim 1, wherein the first wireless communication device and the second wireless communication device are different wireless communication devices.

8. The method of claim 1, wherein the first wireless communication device and the second wireless communication device are the same wireless communication device.

9. A method of wireless communication performed by a wireless communication device configured to operate as a relay, the method comprising:

receiving, from a base station (BS), a reference signal configuration indicating one or more reference signal resources;

transmitting, to a user equipment (UE) in accordance with the reference signal configuration, a first reference signal generated by the wireless communication device, in a first reference signal resource of the one or more reference signal resources, wherein the first reference signal is different from the reference signal configuration;

receiving, from the UE, a first channel state report including channel measurement information for a link between the wireless communication device and the UE based on the first reference signal;

receiving, from the UE, a second reference signal in a second reference signal resource of the one or more reference signal resources; and transmitting, to the BS, a second channel state report based on the second reference signal.

10. The method of claim 9, wherein the first reference signal is a channel state information reference signal (CSI-RS).

11. The method of claim 9,
wherein the second reference signal is a sounding reference signal (SRS).

12. The method of claim 9,
wherein the channel measurement information includes at least one of a reference signal receive power (RSRP), signal-to-interference-plus-noise ratio (SINR), CSI-RS resource indicator (CRI), or a synchronization signal block (SSB) index.

13. The method of claim 9, further comprising:
transmitting, to the BS, a communication signal including the first channel state report.

14. The method of claim 13,
wherein the transmitting the first channel state report includes transmitting the first channel state report via a physical uplink shared channel (PUSCH).

15. The method of claim 13, further comprising:
receiving, from the BS, a data signal based on at least one of the first channel state report or the second channel state report; and
transmitting, to the UE, the data signal.

16. A method of wireless communication performed by a user equipment (UE), the method comprising:
receiving, from a first wireless communication device of one or more wireless communication devices configured to operate as one or more relays, a reference signal configuration indicating one or more reference signal resources;
receiving one or more reference signals, generated by the one or more wireless communication devices, in the one or more reference signal resources in accordance with the reference signal configuration, each of the one or more reference signals being received from a corresponding wireless communication device of the one or more wireless communication devices, the one or more reference signals being different from the reference signal configuration;
transmitting, to a base station (BS) via the first wireless communication device, a first channel state report including channel measurement information for one or more links based on the one or more reference signals, each link connecting a wireless communication device of the one or more wireless communication devices to the UE; and
receiving, from the BS via a second wireless communication device of the one or more wireless communication devices, a data signal based on the first channel state report.

17. The method of claim 16,
wherein the one or more reference signals includes one or more channel state information reference signals (CSI-RSs).

18. The method of claim 16, further comprising:
receiving, from the first wireless communication device, a second reference signal configuration indicating one or more additional reference signal resources; and
transmitting, to the one or more wireless communication devices, one or more additional reference signals in the one or more additional reference signal resources.

19. The method of claim 18,
wherein the one or more additional reference signals include one or more sounding reference signals (SRSs).

20. The method of claim 16,
wherein the first wireless communication device and the second wireless communication device are different wireless communication devices.

21. The method of claim 16,
wherein the first wireless communication device and the second wireless communication device are the same wireless communication device.

22. The method of claim 16,
wherein the channel measurement information includes at least one of a reference signal receive power (RSRP), signal-to-interference-plus-noise ratio (SINR), CSI-RS resource indicator (CRI), or a synchronization signal block (SSB) index for each link of the one or more links.

23. The method of claim 16,
wherein the first channel state report includes channel measurement information for fewer links than a number of wireless communication devices in the one or more wireless communication devices.

24. A base station, comprising:
one or more memories; and
one or more processors, coupled to the one or more memories, configured to cause the base station to:
transmit, to one or more wireless communication devices configured to operate as one or more relays, a reference signal configuration indicating one or more reference signal resources associated with one or more reference signals generated by the one or more wireless communication devices, wherein the one or more reference signals are different from the reference signal configuration;
receive, from a first wireless communication device of the one or more wireless communication devices and in accordance with the reference signal configuration, a channel state report based on the one or more reference signals in the one or more reference signal resources, wherein the channel state report includes channel measurement information for one or more links, each link connecting a wireless communication device of the one or more wireless communication devices to a user equipment (UE); and
transmit, to the UE via a second wireless communication device of the one or more wireless communication devices based on the channel state report, a data signal.

25. The base station of claim 24, wherein the one or more processors are further configured to cause the base station to:
select, based on a location of the UE, the one or more wireless communication devices.

26. The base station of claim 24,
wherein each wireless communication device of the one or more wireless communication devices is a UE.

27. The base station of claim 24,
wherein the one or more reference signals include at least one of a channel state information reference signal (CSI-RS) or a synchronization signal block (SSB).

28. The base station of claim 24,
wherein the channel measurement information includes at least one of a reference signal receive power (RSRP), a signal-to-interference-plus-noise ratio (SINR), a CSI-RS resource indicator (CRI), or a synchronization signal block (SSB) index for each link of the one or more links.

29. The base station of claim 24,
wherein the channel state report includes channel measurement information for fewer links than a number of wireless communication devices in the one or more wireless communication devices.

30. The base station of claim 24,
wherein the first wireless communication device and the
  second wireless communication device are different
  wireless communication devices.

\* \* \* \* \*